United States Patent [19]

Aida et al.

[11] Patent Number: 5,521,751
[45] Date of Patent: May 28, 1996

[54] NOISE MEASUREMENT FOR OPTICAL AMPLIFIER AND A SYSTEM THEREFOR

[75] Inventors: Kazuo Aida, Yokohama; Yoshiaki Sato, Chiba, both of Japan

[73] Assignee: Nippon Telegraph & Telephone Corporation, Tokyo, Japan

[21] Appl. No.: 387,077

[22] Filed: Feb. 13, 1995

[30] Foreign Application Priority Data

Feb. 14, 1994 [JP] Japan .................................... 6-017593

[51] Int. Cl.$^6$ ...................................................... H01S 3/00
[52] U.S. Cl. .......................... 359/337; 359/341; 359/110; 359/177
[58] Field of Search .................................. 359/110, 177, 359/337, 341

[56] References Cited

U.S. PATENT DOCUMENTS

| | | | |
|---|---|---|---|
| 4,947,134 | 8/1990 | Olsson | 330/4.3 |
| 4,947,459 | 8/1990 | Nelson et al. | 455/612 |
| 5,295,015 | 3/1994 | Yoneyama | 359/333 |

FOREIGN PATENT DOCUMENTS

| | | |
|---|---|---|
| 5142596 | 6/1993 | Japan . |
| 5257177 | 10/1993 | Japan . |

OTHER PUBLICATIONS

EEOC'93 Tu3, vol. 2, (1993) "Comparison Of Noise Figure Measurement Methods For Erbiam Doped Fiber Amplifiers", S. Nishi et al.

OFV'92 ThE1 (1992) "Accurate Noise Figure Measurements Of Erbium-Doped Fiber Amplifiers in Saturation Conditions", J. Aspen et al.

ECOC'92, vol. 1, (1992), p. 509, "Pulsed-Source Technique For Optical Amplifier Noise Figure Measurement", D. M. Bney et al.

Technical Digest, (1993) pp. 105–108, "Noise Figure Measurement of Erbium-Doped Fibers Amplifiers With A Pulsed Signal Source", Klar et al.

IEEE Photonics Technology Letters, vol. 5, No. 12, Dec. 1993, pp. 1436–1438, "Noise-Figure Monitoring of a Cascaded In-Line Erbium-Doped Fiber Amplifier", H. Masuda et al.

Primary Examiner—Mark Hellner

[57] ABSTRACT

A method and a system for measuring a noise figure of an optical amplifier which independently detects two different output powers generated from the optical amplifier under measurement. The generation of the first output power is in synchronization with a space period of an input optical pulsed signal, while the generation of the second output power is in synchronization with the mark period of the input optical pulsed signal. The optical pulsed signal is an intensity-modulated signal given at a repetition period which is sufficiently shorter than the life time of carriers or the life time of ions in a metastable level of the optical amplifier under measurement.

23 Claims, 26 Drawing Sheets

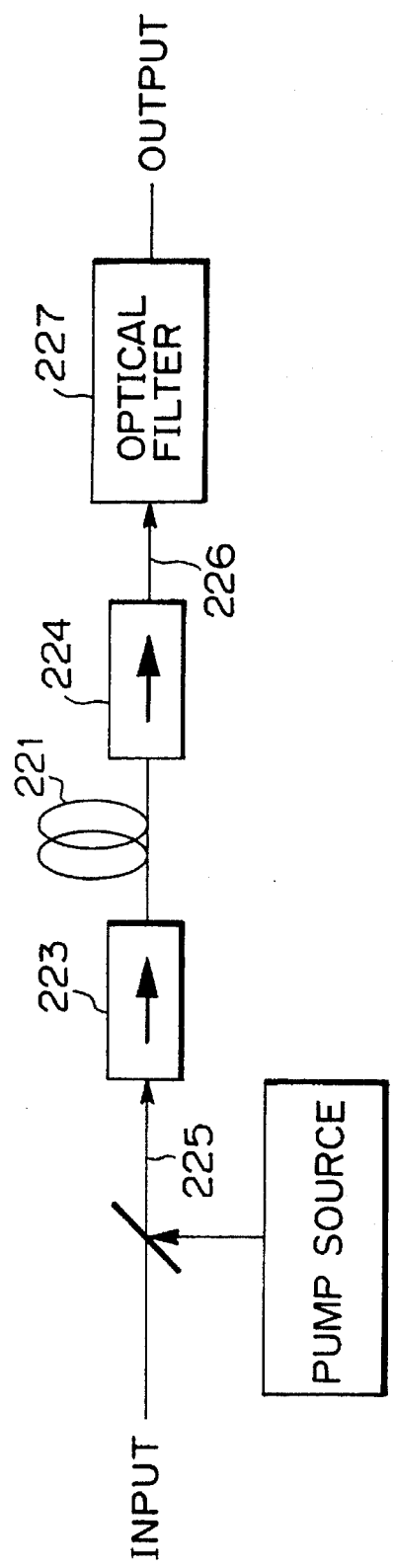
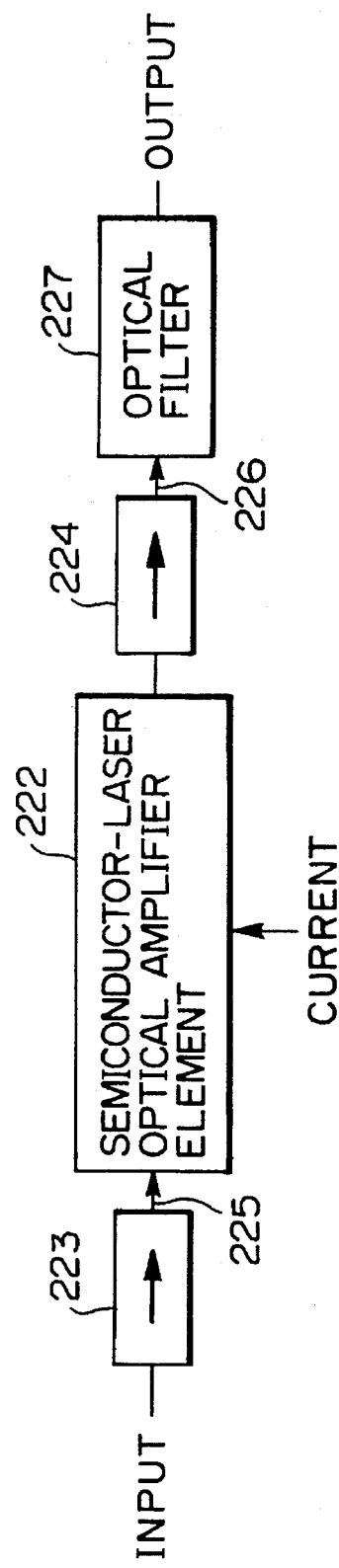
FIG. 2A   PRIOR ART
FIG. 2B   PRIOR ART

500ns/div.

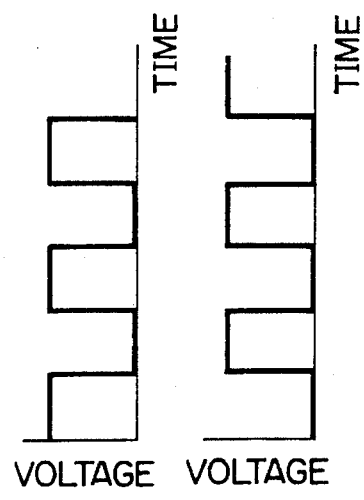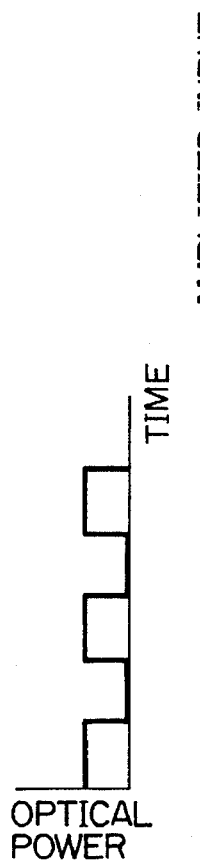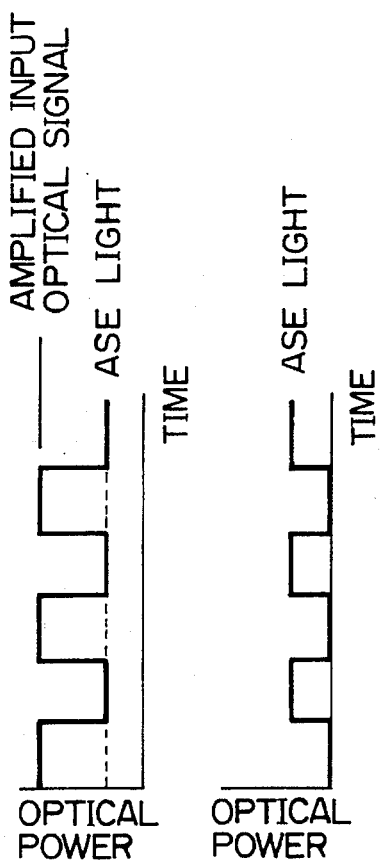
FIG. 14 (a) MODULATION SIGNAL GENERATOR MODULATION SIGNAL Q
FIG. 14 (b) REVERSED SIGNAL SYNCHRONIZED WITH MODULATION SIGNAL GENERATOR Q̄
FIG. 14 (c) INPUT OPTICAL SIGNAL FOR OA
FIG. 14 (d) OUTPUT OPTICAL SIGNAL FROM OA
FIG. 14 (e) OUTPUT OPTICAL SIGNAL OF OPTICAL SWITCH

NOISE MEASUREMENT FOR OPTICAL AMPLIFIER AND A SYSTEM THEREFOR

BACKGROUND OF THE INVENTION

1. Field of the Invention

The present invention relates to a method of directly measuring noise emitted from an optical amplifier and a system used for performing a noise figure measurement.

2. Description of the Prior Art

Heretofore, optical amplifiers and optical amplifier systems using optical amplifiers have been studied and developed in the field of optical communications. Optical amplifiers directly amplify optical signals. Two types of optical amplifiers are known, optical fiber amplifiers and semiconductor laser amplifiers. The semiconductor laser amplifiers take advantage of optical amplification phenomena in semiconductor lasers.

It is well known that there are several types of optical fiber amplifiers, for example, a fiber amplifier using the non-linearity properties of a silica fiber and a rare earth doped fiber amplifier. The rare earth doped fiber amplifier comprises an optical fiber having a core material doped with a rare earth such as erbium (Er) or neodymium (Nd). The operation of this kind of amplifier is based on the fact that the output power is emission stimulated by an input signal light from rare earth ions at a high energy level. In this case, particularly, Er-doped fiber amplifiers are now suitable for practical application in the field of optical communications because, for example, a gain band can be obtained at 1.53–1.56 μm. Consequently, high-performance semiconductor lasers for employment as optical sources for EDFA pumping have been developed.

FIG. 1 shows an energy level diagram for explaining the optical amplification phenomena of the Er-doped fiber amplifier. When an optical amplification medium (i.e., an Er-doped optical fiber) receives energy from an optical source (i.e., a semiconductor laser) for pumping, ions in a core of the fiber are pumped from a ground state to a pump level. Then the ions are transited downwardly from the pump level to a metastable level without optical emission. The population of atoms in the metastable level increases and exceeds the number in the ground state, a condition called population inversion. Then optical emission can occur when the ions in the metastable level are transited to the ground state. In this case, two types of downward transitions occur: a stimulated-emission step in which the transition of ions is induced by an input light; and a spontaneous-emission (SE) step in which the transition of ions occurs spontaneously without an input light. The stimulated emission step corresponds to optical amplification. The stimulated emission enables the high-speed transition of ions and optical amplification at a band width of 1 THz (terahertz) or more. Because the now highest transmission speed of signal light is 2.4 Gbit/sec. in commercial optical communications, stimulated emission offers the hope of amplifying a higher-speed signal light. In the case of spontaneous emission, on the other hand, a lower-speed atom transition can occur, compared with that of stimulated emission. The mean life of spontaneous emission (i.e., the mean life of ions) is in the range of several milliseconds to several tens of milliseconds for the Er-doped optical fiber. The spontaneous emission light (hereinafter, referred to as SE light) is amplified in the Er-doped optical fiber and outputted as an amplified spontaneous emission (hereinafter, referred as to ASE) optical power.

The setup of the conventional optical amplifier will be explained first with reference to FIGS. 2A and 2B for a more detailed explanation.

FIG. 2A is a schematic block diagram of an optical amplifier comprising a rare earth doped optical fiber 221, while FIG. 2B is a schematic block diagram of an optical amplifier comprising a semiconductor optical amplification element 222.

In these figures, the measurement setup is constituted so as to place the optical amplification medium (hereinafter referred to as the OA medium) 221 or 222 between optical isolators 223, 224 to solve the problem of causing unstable amplification. That is, an optical amplification medium 221 or 222 amplifies the input light in both directions. This means that the amplified signal light 225 and the ASE light 226 are reflected by the optical components in front and behind the OA medium 221 or 222, so that the OA medium 221 or 222 is oscillated by these lights, resulting in unstable amplification. Therefore, the optical amplifier is placed between optical isolators 223, 224 to maintain stable amplification.

The optical amplifiers shown in FIGS. 2A and 2B also comprise an optical band-pass filter (BPF) 227 just before an output port of the optical amplifier for removing undesired ASE optical power having a wavelength different from that of the signal light. If the amplified signal light is much larger than the ASE light, the BPF 227 may be omitted.

Furthermore, the optical amplifier described above should be evaluated for its performance. In general, noise figure (NF) is one of the important parameters to evaluate the amplifier's performance. The NF parameter can be written as:

$$NF = \frac{P_{ASE}}{h_\nu G B_0} + \frac{1}{G} \qquad (1)$$

wherein $P_{ASE}$ is the ASE optical power of an optical wave form emitted from the optical amplifier, $B_o$ is the optical bandwidth of a measurement device for measuring the $P_{ASE}$ level, G is the gain of the optical amplifier under measurement, h is Planck's constant, and ν is the optical frequency of the signal light. The second term in (1) can be neglected for high gain amplifier evaluation for simplicity.

The noise figure measurement described above enables one to judge the performance (i.e., failure, performance degradation, and so on) of the optical amplifiers and also to compare their performances. Therefore, a simple and reliable system for measuring the noise figure with a high-accuracy has been demanded. However, it is impossible to directly obtain the $P_{ASE}$ level to be used as a constant in the equation (1) for determining the NF because of the reasons described below.

Referring to the attached figures for understanding the problems of the conventional NF measurement method, FIG. 3 shows the inside of an OA medium 221 or 222 of the optical amplifier while FIG. 4 shows variations in gain (GF) and noise figure (NF) against an input optical power level in the typical optical amplifier. The input light passing through the optical amplifier is amplified in the OA medium. In this case, an ASE light generated from the medium can be transmitted in both directions (i.e., forward and backward directions) toward an input port and an output port of the amplifier. In the case of an optical amplifier having an optical isolator, the isolator blocks the ASE light directed in the backward direction. The ASE optical power required for determining the NF is a part of the ASE light propagated in the forward direction and it must have a wavelength corresponding to that of the input light. The optical power can be generated from the optical amplifier as the sum of the amplified input light which is amplified in the OA medium and the ASE light propagated in the forward direction. Therefore, it is necessary to separate the amplified input light and the ASE light and to perform their measurements independently.

In recent years, several NF measurement methods have been proposed, for example, an optical spectrum analyzer method (OSA method), an electric test method (S. Nishi & M. Saruwatari, "Comparison of Noise Figure Measurement Methods for Erbium doped Fiber Amplifiers", ECOC '93 Tu3, 1993), a Polarization test method (J. Aspen, J. F. Federici, B. M. Nyman, D. L. Wilson, a D. S. Shenk, "Accurate noise figure measurements of erbium-doped fiber amplifiers in saturation conditions", OFC '92 THE1, 1991), a Pulse test method.

The conventional NF measurement methods will be explained with reference to FIGS. 5–8.

FIG. 5 is a schematic block diagram of a NF measurement system for explaining an example of one conventional method (the OSA method). According to this method, a laser beam from laser diode (LD) light source 51 passes through an optical amplifier (OA) 52 under measurement to generate an output to be observed by an optical spectrum analyzer 53. Though the laser beam is of a single wavelength, the Output is generated as the sum of an amplified input light and an ASE light over a wide band of wavelengths. The optical power of the ASE light ($P_{ASE}$) can be estimated from the spectra of the output. That is, the method includes the steps of:

(i) overlapping two output spectra: the output spectrum of the OA under measurement at a switch-off period in which the OA does not receive the input light; and an input spectrum of the laser beam at a switch-on period in which the OA receives the input light; and (ii) estimating the level of the $P_{ASE}$ that has a wavelength corresponding with that of the laser beam.

As the $P_{ASE}$ level cannot be measured directly, the results tend to vary with each observer. In this case, for example, it is necessary to use a computer or the like for fitting one spectrum with another to estimate the $P_{ASE}$ level of each optical amplifier by a series of measurements made automatically on a large scale.

FIG. 6 is a schematic block diagram of a NF measurement system for explaining a second preferred embodiment of the conventional methods (the Polarization test method). According to this method, a polarization controller 54 and a polarizer 55 are arranged between an optical amplifier (OA) 52 under measurement and an optical spectrum analyzer 53. In this arrangement, a laser beam from an LD light source 51 passes through the OA 52 to generate an output to be observed by an optical spectrum analyzer 53 in the same manner as that of the OSA test method (FIG. 5). In this method, furthermore, the polarization controller 54 must be regulated so as to make a single polarized light condition of the amplified laser light intersect perpendicular to the transmission characteristic of the polarizer 55. That is, the regulation should be performed so as to minimize the level of the laser light power received by the optical spectrum analyzer 53. If the polarized light condition is a single one and intersects perpendicular to the transmission characteristic of the polarizer 55, transmission of the amplified laser light can be prevented. However the ASE light is not polarized, so that its output level can be reduced to half by passing through the polarizer 55. Ideally, the optical spectrum analyzer 53 should only observe the spectrum excepting the amplified laser light to determine the $P_{ASE}$ level from the result of measuring the optical power of the wavelength corresponding with that of the laser beam.

The second preferred embodiment demands skill in the operator because it is hard to regulate the polarization controller 54. Therefore, it should not be applied in the NF measurements at a stage of the manufacturing process for each of the optical fibers which are mass-produced. To solve this problem, it has been suggested that a control means be employed which automatically adjusts the polarization. However, this method cannot be used to make NF measurements in practice because it increases the complexity of the apparatus and method.

On the other hand, the pulse test method utilizes the fact that the time constant of the Er-doped optical fiber is relatively long. This method includes the steps of providing a pulsed light input to the OA and measuring each level of an amplified spontaneous emission (ASE) light and a signal light by means of an OE converter having time windows. In accordance with the pulse test method, in general, the system configuration for the measurement can be simplified in spite of performing the measurement quickly with a high accuracy. Further the pulse test method has some peculiarities, for example it is not susceptible to a polarization hall burning, a single polarization, and a broad width of optical source spectrum.

Furthermore, the conventional pulse test method will be explained in detail with reference to the attached drawings.

FIG. 7 is a schematic block diagram of the setup for the conventional pulse test method and FIG. 8 is a wave form illustrating an optical surge observed in the setup of FIG. 7 (see references: D. M. Bney and J. Dupre, "Pulsed-source technique for optical amplifier noise figure measurement", ECOC '92, p509, 1992; and Klar and W. E. Heinlein, "Noise figure measurement of erbium-doped fibers amplifiers with a pulsed signal source", Technical Digest of 2nd optical fibers measurement conference, pp. 105–108, 1993 (Torino)). In this method, a rectangular on-off input signal is subjected to low-speed modulation so as to have a switching frequency of about 100 Hz, which is sufficiently lower than the time constant of the optical amplifier. At the moment of switching the signal input off, the ASE level at the output port of the OA remains at the stationary state corresponding to the level observed in the period of the switching on. Therefore, it is possible to calculate the signal light power and ASE optical power ($P_{ASE}$) independently.

However the conventional pulse test method causes the following troubles. That is, if the switching-off period is not sufficiently short (i.e., switching delay), as shown in FIG. 7, the ASE light can be recovered to some extent before the input signal level disappears completely. Therefore it is acceptable to estimate the $P_{ASE}$ level from an over-responded wave of the ASE light. As shown in FIG. 8, furthermore, there is a sudden increase as a peak output (i.e., optical surge) in a risen-up portion of a pulse of the output light. In this case, the magnitude of the peak output depends on the input power and the linear gain, so that it may be on the order of several watts. Consequently, a part of the optical amplifier may be damaged by the peak output.

SUMMARY OF THE INVENTION

An object of the present invention is to provide a NF measurement method for readily determining noise figure with a high accuracy by directly measuring a correct ASE power level of an optical amplifier under measurement without causing troublesome optical surge generation.

In a first aspect of the present invention, there is provided a method of measuring a noise power of an optical amplifier comprising the steps of:

generating an optical pulsed signal by modulating an intensity of an input light so as to be given at a repetition rate having a period shorter than a life time of carriers or a life time of ions in a metastable level of an optical amplifier under measurement;

providing the optical pulsed signal into the optical amplifier under measurement;

isolating an output power ($P_{ASE}$) of the optical amplifier under measurement, in which the output power is synchronized with a space period of the optical pulsed signal; and detecting a level of the output power of the optical amplifier under measurement.

Here, a value of the noise figure may be obtained by the equation:

$$NF = \frac{P_{ASE}(\text{peak value})}{h_v G B_0} + \frac{1}{G} \qquad (1)$$

where NF is the noise figure; $P_{ASE}$ on a peak power basis is the output power of the optical amplifier under measurement, synchronizing with the space period of the optical pulsed signal; $B_o$ is an optical band width when a level of the $P_{ASE}$ is measured; G is a gain of the optical amplifier; h is Planck's constant; and v is an optical frequency of the optical pulsed signal.

The optical amplifier under measurement may be replaced by a passive optical component which does not generate an amplified spontaneous emission (ASE), for a calibration of the measurement, the calibration process includes the step of separating and detecting:

the output power $P_{leakage}$ in synchronization with the space period of the optical pulsed signal; and an output power $P_{OUT}$ in synchronization with the mark period of the optical pulsed signal, and then performing a quantitative determination of a leakage characteristic Iso of the measurement system by the equation:

$$\text{Iso} \cong \frac{P_{leakage}(\text{time averaged value})}{P_{out}(\text{time averaged value})}$$

A ASE optical power with a calibration of the leakage power ($P_{ASE}^{calibrated}$) may be calculated by an equation:

$$P_{ASE}^{calibrated} = P_{ASE}(\text{peak value}) - \text{ISO} \cdot P_{AMP}(\text{peak value});$$

and a resulting $P_{ASE}^{calibrated}$ value ms used in the noise figure measurement.

An optical power detector having the optical band width of $B_o$ and a center wavelength corresponding to a wavelength λ of the optical pulsed signal to be provided into the optical amplifier under measurement may be used for the purpose of separating and detecting:

the output power $P_{ASE}$ generated from the optical amplifier under measurement in synchronization with the space period of the optical pulsed signal; and an output power $P_{AMP}$ generated from the optical amplifier under measurement in synchronization with the mark period of the optical pulsed signal.

The gain G may be obtained from the equation:

$$G \cong \frac{P_{AMP}(\text{peak value}) - P_{ASE}(\text{peak value})}{P_{Input}(\text{peak value})}$$

where $P_{input}$ is an input optical power of the intensity-modulated light into the optical amplifier.

The gain G may be obtained from an equation of:

$$G = \sqrt{\frac{P_{AMP-E}}{P_{IN-E}}}$$

where $P_{IN-E}$ is a component of intensity modulation obtained by converting the optical pulsed signal into an electrical signal; $P_{AMP-E}$ is a component of intensity modulation obtained by converting an output light of the optical amplifier under measurement.

The optical pulsed signal to be provided into the optical amplifier under measurement may be generated from a semiconductor laser driven by an electric pulsed signal.

The optical pulsed signal to be provided into the optical amplifier under measurement may be obtained by passing an output light generated from a non-modulation optical source through an optical switch driven by an electric pulse signal, The optical switch may be a type driven by an optical pulsed signal given at a repetition rate in synchronization with that of the optical pulsed signal to be provided into the optical amplifier under measurement, for separating and detecting:

the output power $P_{ASE}$ generated from the optical amplifier under measurement in synchronization with the space period of the optical pulsed signal; and the output power $P_{AMP}$ generated from the optical amplifier under measurement in synchronization with the mark period of the optical pulsed signal.

An acousto-optic switch may be used as the optical switch to be driven by an optical pulsed signal given at a repetition rate in synchronization with that of the optical pulsed signal to be provided into the optical amplifier under measurement.

The acousto-optic switch may be composed of a plurality of linked acousto-optic elements in a row.

The optical switch to be driven by an optical pulsed signal given at a repetition rate in synchronization with that of the optical pulsed signal to be provided into the optical amplifier under measurement may be controlled so as to be driven in a period for the measurement, the period for the measurement having a guard timing.

The repetition rate in synchronization with that of the optical pulsed signal provided into the optical amplifier may be provided so as to pass through an optical filter having a pass-band width different from the center wavelength λ of the optical pulsed signal to be provided into the optical amplifier under measurement.

The $P_{ASE}$ at a spectrum of the optical pulsed signal may be estimated by performing an interpolation for an ASE optical power measured on a periphery of the spectrum of the optical pulsed signal.

The optical amplifier under measurement may be an erbium-doped optical fiber amplifier, and the optical pulsed signal with a modulated intensity has a repetition rate of 10 kHz or more.

The optical amplifier under measurement may be a semiconductor laser amplifier, and the optical pulsed signal with a modulated intensity has a repetition rate of 1 GHz or more.

An output light of the optical amplifier under measurement may include an amplified optical pulsed signal having a polarized plane thereof, the output power including an amplified optical pulsed signal and generated from the optical amplifier under measurement in synchronization with the mark period of the optical pulsed signal may be coincident with a polarized plane of the amplified pulsed signal, and the output power including an amplified optical pulsed signal and generated from the optical amplifier under measurement in synchronization with the space period of the optical pulsed signal may be coincident with a polarized plane of the amplified pulsed signal, where these output powers are independently measured.

In a second aspect of the present invention, there is provided a measurement system for measuring a noise figure of an optical amplifier under measurement, comprising:

an input terminal connecting with an input port of the optical amplifier under measurement;

an output terminal connecting with an output port of the optical amplifier under measurement;

a supply means for supplying an optical pulsed signal into the input terminal, the optical pulsed signal is an intensity-modulated signal given at a repetition rate having a period sufficiently shorter than a life time of carrier or a life time of ions in a metastable level of the optical amplifier under measurement;

a detection means for separating and detecting:

an output power $P_{ASE}$ generated from the output terminal in synchronization with a space period of the optical pulsed signal; and an output power $P_{AMP}$ generated from the output terminal in synchronization with the mark period of the optical pulsed signal on.

Here, the supply means for supplying an optical pulsed signal into the input terminal, may comprise an electro-optic converter to be modulated by an electric pulsed signal, and the detector is connected with an output circuit of the optical amplifier under measurement and comprises an optical switch to be controlled by an electrical signal in synchronization with the electric pulsed signal.

A measurement system may further comprise a computing device for computing results of the detection by the detecting means.

The above and other objects, effects, features and advantages of the present invention will become more apparent from the following description of embodiments thereof taken in conjunction with the accompanying drawings.

BRIEF DESCRIPTION OF THE DRAWINGS

FIG. 2A is a schematic block diagram of the setup for making a NF measurement of a rare earth doped optical fiber amplifier;

FIG. 2B is a schematic block diagram of the setup for making a NF measurement of a semiconductor laser optical amplification element;

FIGS. 14(a)–14(e) constitute a wave form chart for explaining each wave form of a modulation signal, reversed signal, input light, output light, and ASE light for the first preferred embodiment of the NF measurement system in accordance with the present invention;

DETAILED DESCRIPTION OF THE PREFERRED EMBODIMENTS

A method of measuring the noise figure performance of an optical amplifier in accordance with the present invention is based on the following phenomena. That is, as explained in the conventional examples described above, an optical spectrum analyzer detects an output from an optical amplifier (OA) as a sum of an amplified intensity-modulated light and an ASE light when an input signal is introduced into the OA. In the case of providing the OA with an input optical signal subjected to intensity-modulation by a pulse signal, the amplified intensity-modulated light is composed of two portions: a first or mark portion that includes the input optical signal passing through the OA which corresponds to the duration of switching the input signal on (hereinafter referred to as a switch-on period); and a second or space portion that corresponds to the duration of switching the input signal off (hereinafter, referred to as a switch-off period). During the switch-off period, the ASE light can be varied in accordance with the metastable level life time. In this invention, therefore, the OA under measurement receives an optical amplified signal given at a repetition rate having a sufficiently short period compared with the metastable level life time of the OA, with the result that the ASE light can be continuously observed during the switch-off period.

Figure 1:
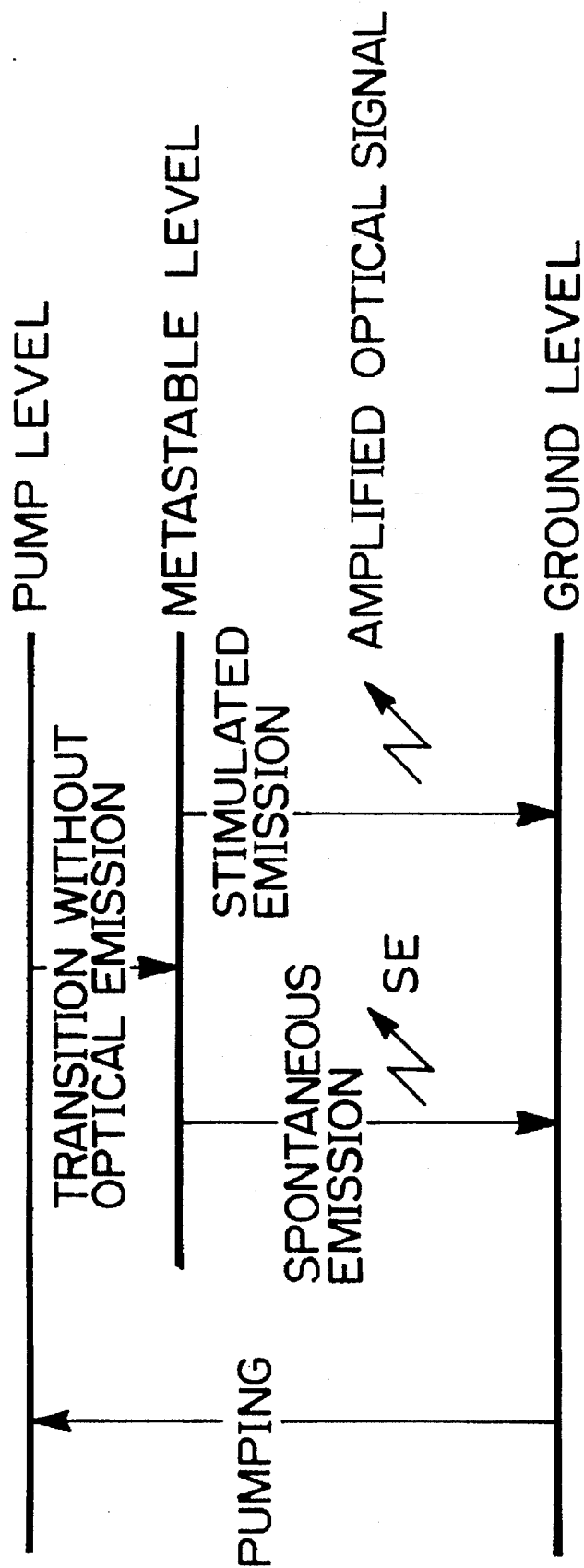
FIG. 1 is an energy level diagram for explaining optical amplification in the Er-doped fiber amplifier.
Figure 3:
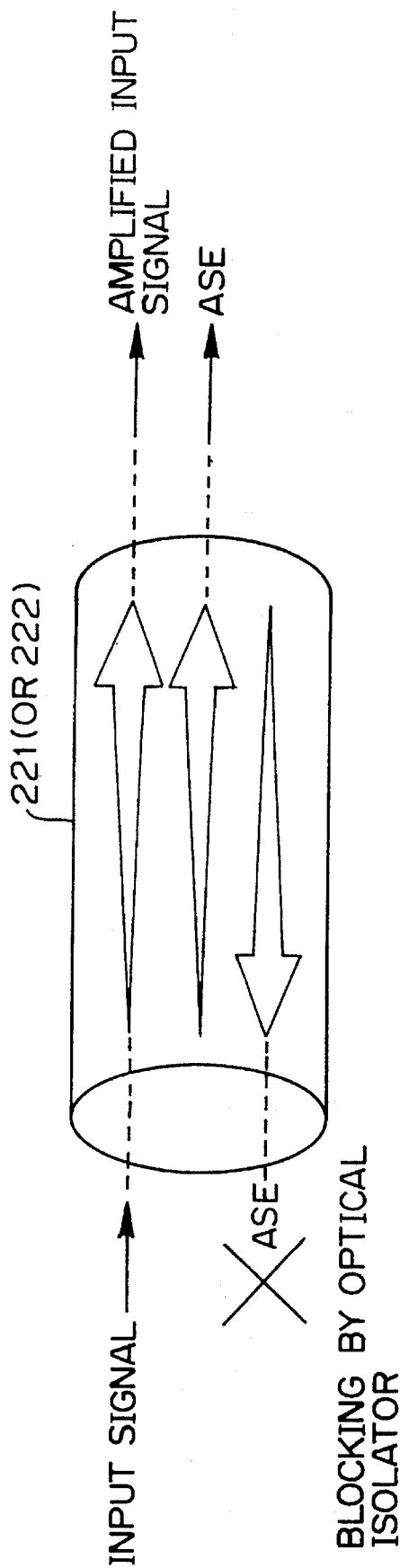
FIG. 3 is a schematic representation of the inside of an optical amplification medium for explaining transmission of an optical pulsed signal passing through the medium.

According to the present invention, the NF measurement method includes the step of detecting an output light generated from the OA under measurement in synchronization with the switch-off period. In this case, the time constant of the metastable level can depend on the life time of ions in the upper state (see FIG. 1) when the OA under measurement is the type which uses an optical fiber doped with a rare-earth element, or it can depend on the life time of carriers when the OA under measurement is the type which uses a semiconductor element.

Figure 9:
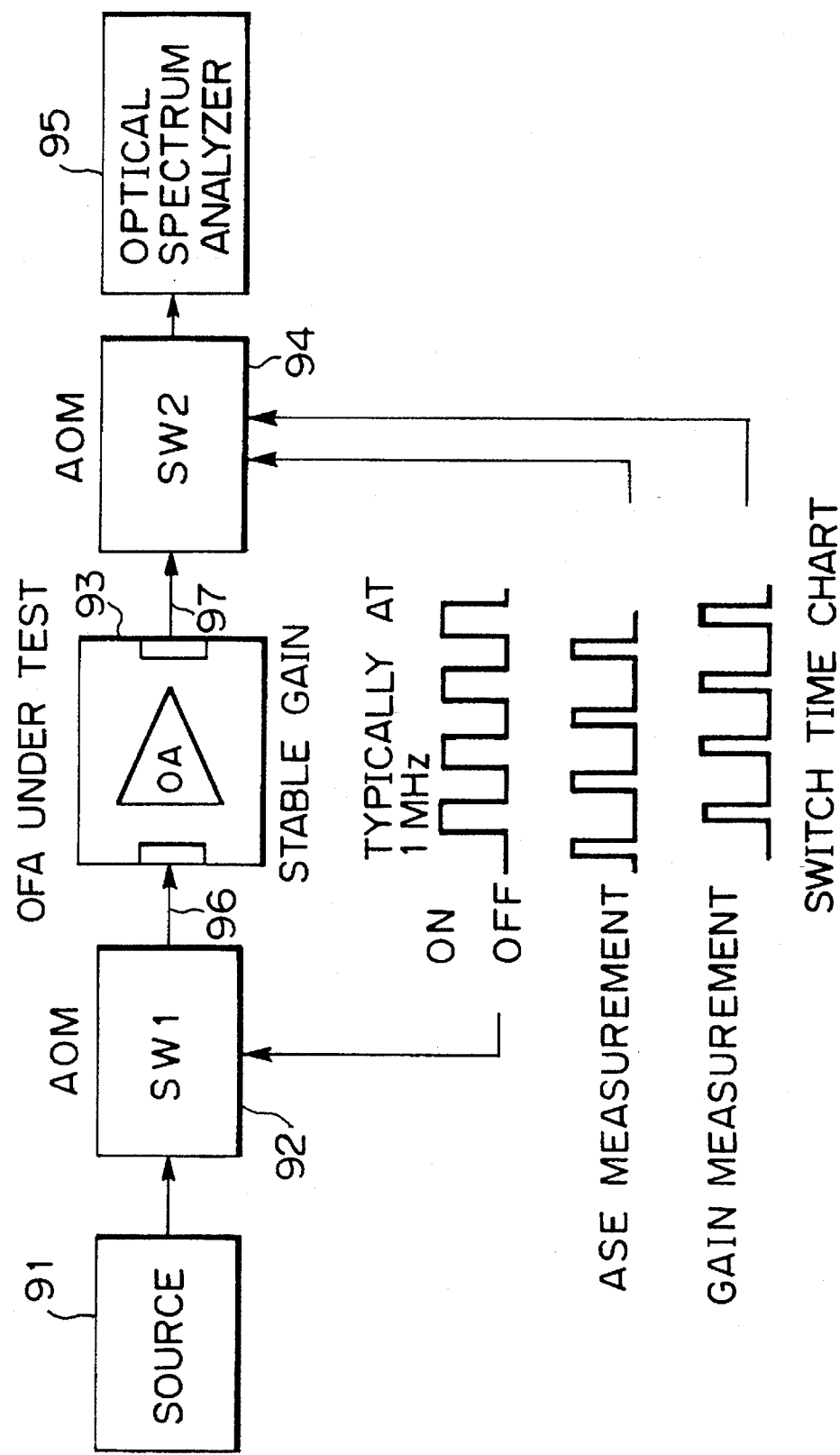
FIG. 9 is a schematic block diagram with a wave form chart for explaining the setup for a first preferred embodiment of the NF measurement method in accordance with the present invention.

FIG. 9 is a schematic block diagram of the setup for performing a NF measurement as one of the preferred embodiments of the present invention.

In this method, firstly a light beam transmitted from an optical source 91 is converted into an optical pulse signal 96 consisting of a train of equally spaced rectangular pulses at a frequency of approximately 1 MHz by means an optical switch (SW1) 92. Then the input signal 96 is introduced into an optical amplifier (OA) 93 under measurement.

Secondly, an optical switch (SW2) 94 samples an output light 97 generated from the OA 93. That is, the SW2 94 samples a series of marks shown in a wave form of the output signal to obtain an amplified optical signal power ($P_{AMP}$), the level of which is determined by an optical spectrum analyzer 95. These marks are generated in synchronization with intervals of time characterized in that the optical pulse signal 96 is present. In the case of sampling non-marked or space portions of an output pulse, on the other hand, an amplified spontaneous emission power ($P_{ASE}$) level is measured with the optical spectrum analyzer 95. For the optical switches SW1 and SW2, acousto-optical modulators (AOM) are preferably used in the present invention because of their high isolation levels and their high-speed functions. Accordingly, the NF level can be easily determined by measuring the $P_{ASE}$ level of the obtained ASE optical spectrum. As will be described later, it is also possible to use a narrow band width optical filter and an optical power meter instead of the optical spectrum analyzer for measuring the $P_{ASE}$ level, and also the gain response of the OA can be determined by alternating the driving phase of the optical switches SW1 and SW2.

Figure 10:
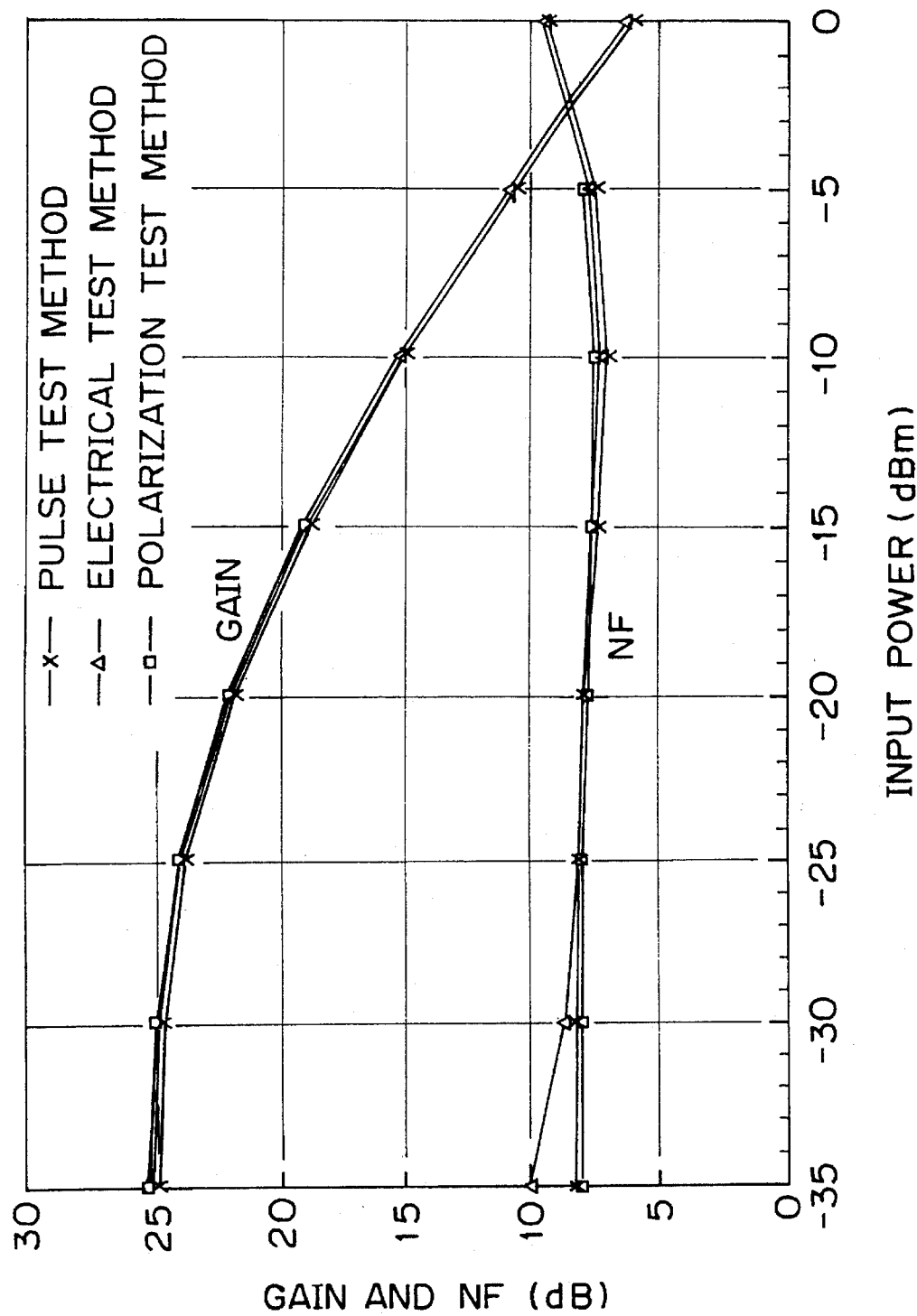
FIG. 10 is a graphical representation for explaining the results of the NF measurement in accordance with the present invention.
Figure 11:
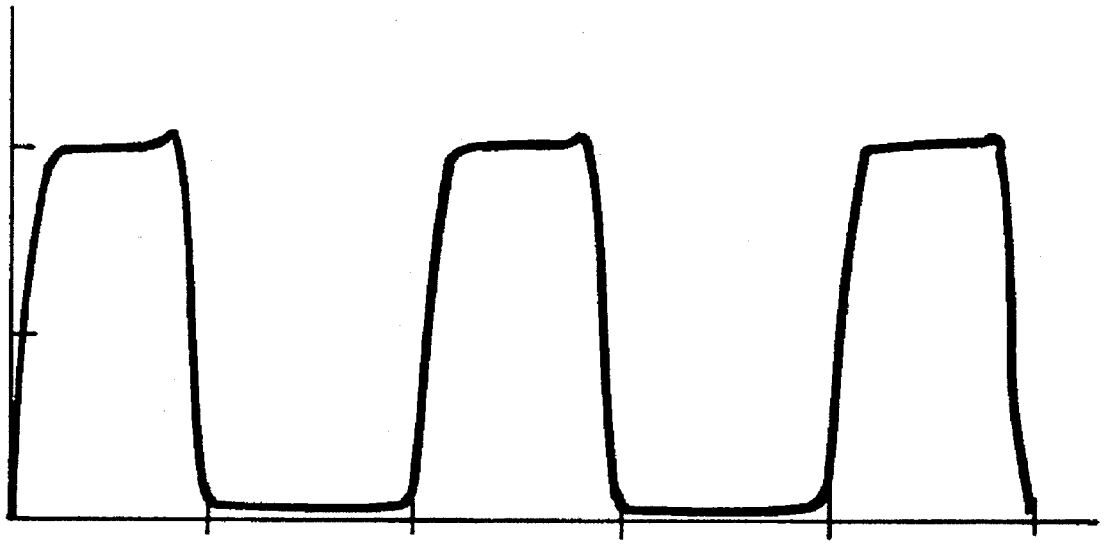
FIG. 11 is a wave form chart for explaining an amplified input optical signal observed in the NF measurement in accordance with the present invention, in which an optic surge is not found.

FIG. 10 is a wave form chart showing that the gain and NF levels determined by the NF measurement method (i.e., the novel pulse test method) of the present invention are almost the same as that of the conventional methods (i.e., the electrical test method and the polarization test method).

Figure 7:
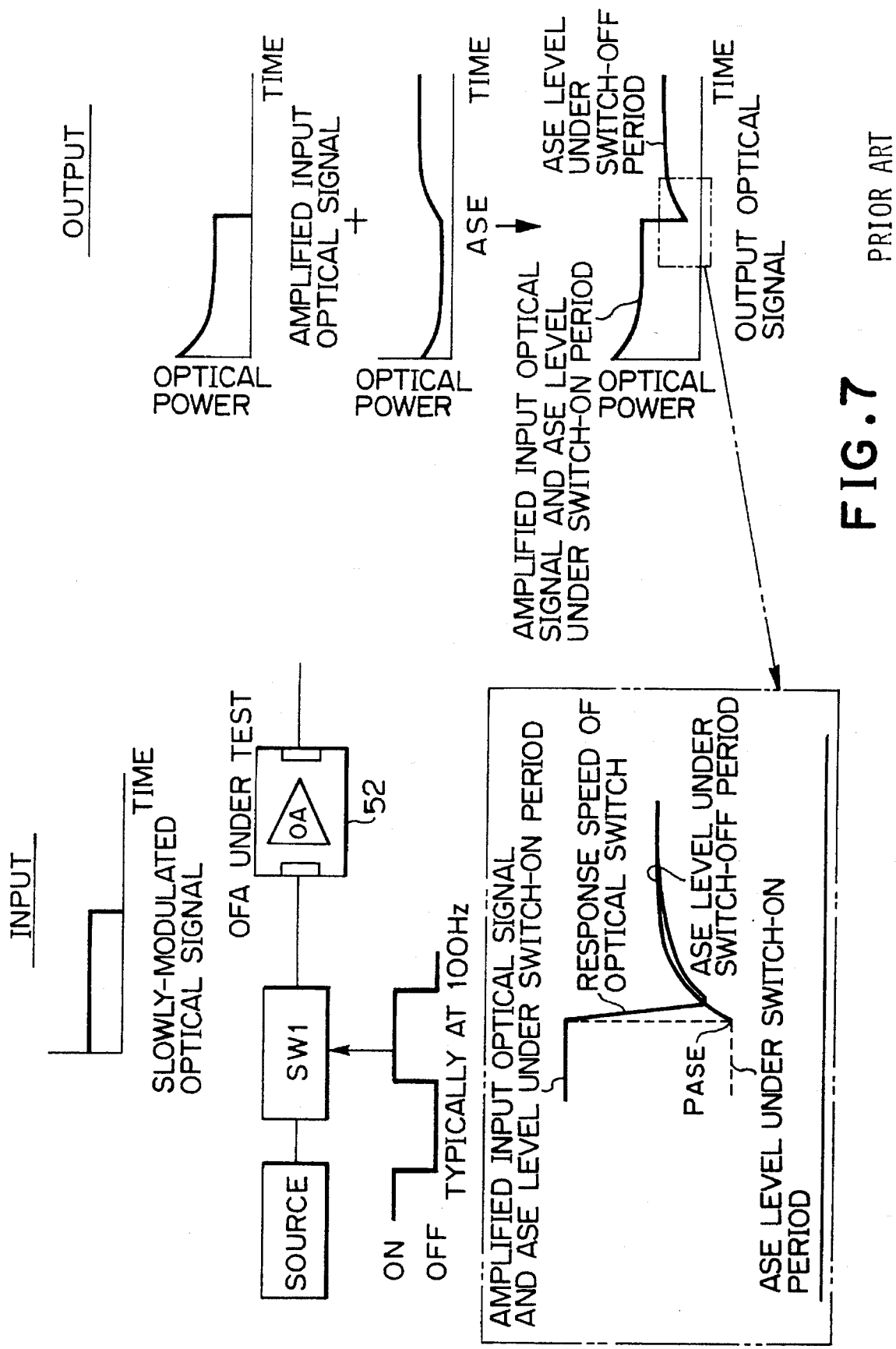
FIG. 7 is a schematic diagram with a wave form chart for explaining the setup for the conventional pulse test method of making an NF measurement.
Figure 8:
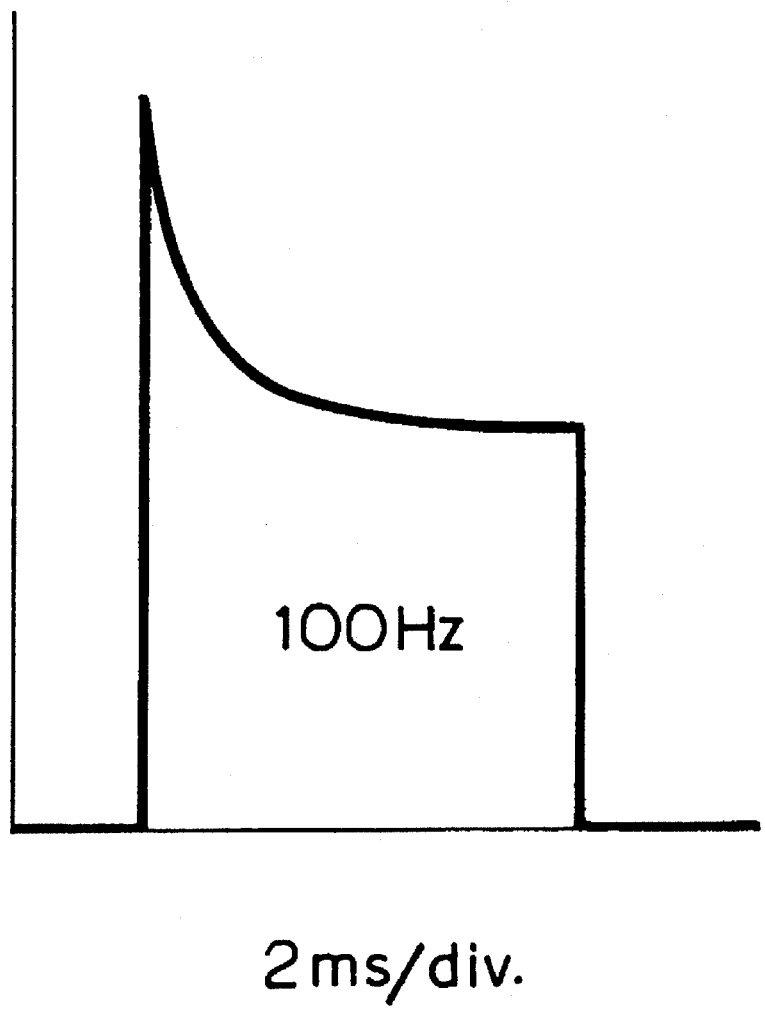
FIG. 8 is a wave form chart for explaining an optical surge observed in the setup for the conventional pulse test method.

The NF measurement method of the present invention shown in FIG. 9 is different from the conventional one shown in FIG. 7 in: (i) providing the OA under measurement with an optical signal which is modulated by a pulse signal or a short period compared with the life time of carriers of the life time of ions in the metastable level of the OA under measurement; and (ii) sampling the output light from the OA under measurement by operating the optical switch so as to synchronize its switching movement with the signal for driving the input modulated light. Consequently, only the optical spectrum of the ASE light can be observed by the optical spectrum analyzer. In other words, this is because the optical switch only permits the transmission of output light to the spectrum analyzer during the period when the amplified intensity-modulated light is switched off (i.e., during the switch-off period).

The NF measurement in accordance with the present invention is based on the condition that the amplified spontaneous emission optical power of the output light corresponding to the switch-off period and the ASE optical power ($P_{ASE}$) of the output light corresponding to the switch-on period are at the same level. In the case of testing a rare-earth doped optical fiber amplifier (OFA), this condition can be attained by providing the optical amplifier with an optical pulse signal having a repetition rate with a sufficiently short period compared with the mean life of ions in the metastable level of the OFA under measurement. In the case of testing a semiconductor laser optical amplifier, on the other hand, this condition can be attained by providing the optical amplifier with an optical pulse signal given at a repetition rate having a sufficiently short period compared with the mean life of the carriers.

We now explain the ASE optical power ($P_{ASE}$) of the optical amplifier (OA) after inputting an intensity-modulated light. In general, the level of the ASE optical power depends on a population inversion of ions in the OA. That is, if an input light is introduced into the OA, the input light is amplified by a stimulated emission and the ions under the population inversion are transited from the metastable level to the ground level. Hence the population inversion can be decreased by an increase in the strength of light introduced into the OA under measurement. That is, the level of the ASE optical power may be varied, depending on whether the OA obtains the input light and whether the input light level is varied.

However, if the optical amplifier receives a pulse stream of a constant repetition rate faster than the response time against the light input of the population inversion, the population inversion tends to stay at a constant state because it cannot follow the variation of the input light. The response time against the input light of the population inversion depending on the amplification medium and is dominated by the life time ($t2eff$) of ions in the metastable level. In the case of the Er-doped optical fiber amplifier, the life time ($t2eff$) of ions is in the range of 0.2 to several tens of milliseconds.

If the Er-doped optical fiber amplifier receives an intensity-modulated light of over several tens of kHz, the population inversion cannot follow the variation of the input light, with the result that the ASE optical power of the output light corresponding to the space period of the amplified intensity-modulated light and the ASE optical power of the output light corresponding to the mark period of the amplified intensity-modulated light agree with each other.

Figure 12A:
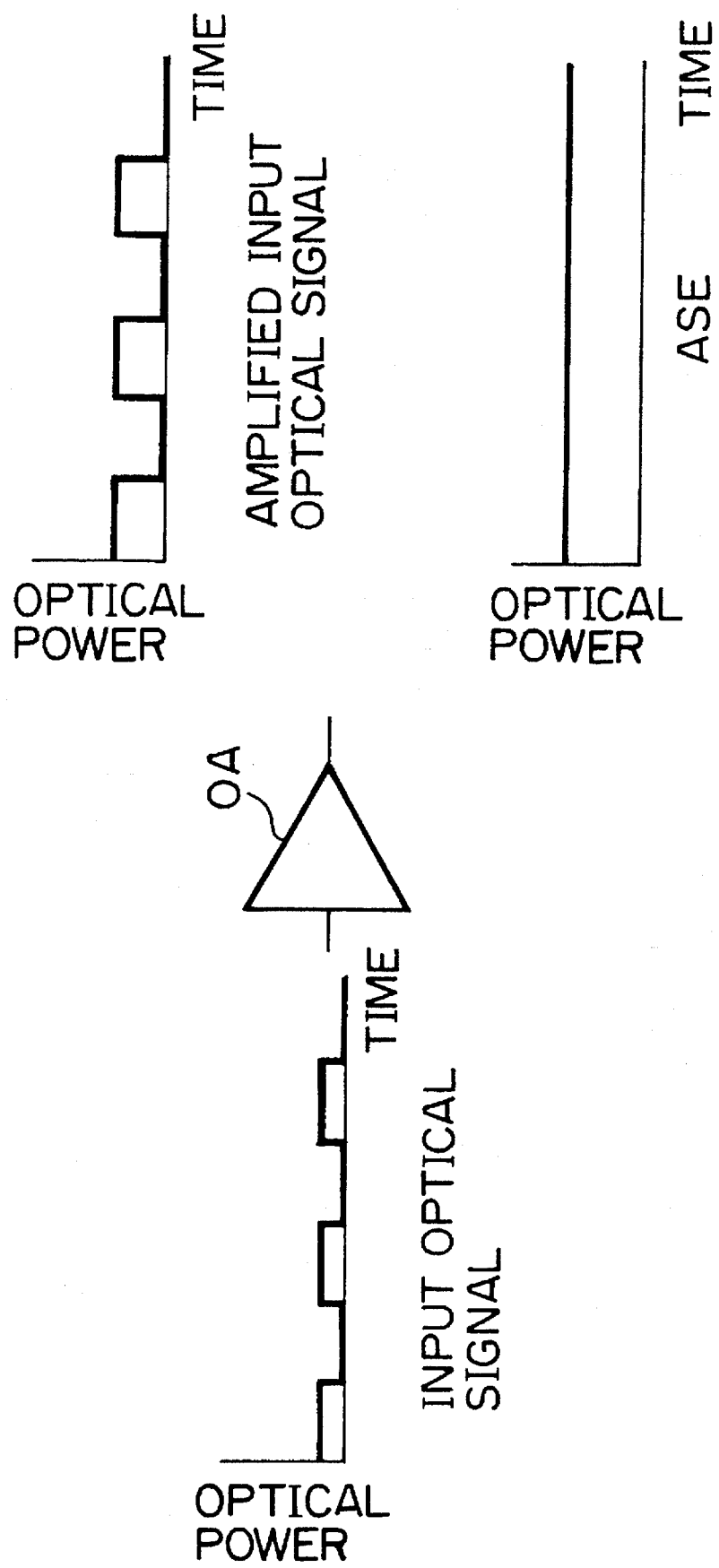
FIG. 12A is a wave form chart for explaining a variation of the $P_{ASE}$ when a high-speed modulated small signal is inputted in an optical amplifier under measurement.
Figure 12B:
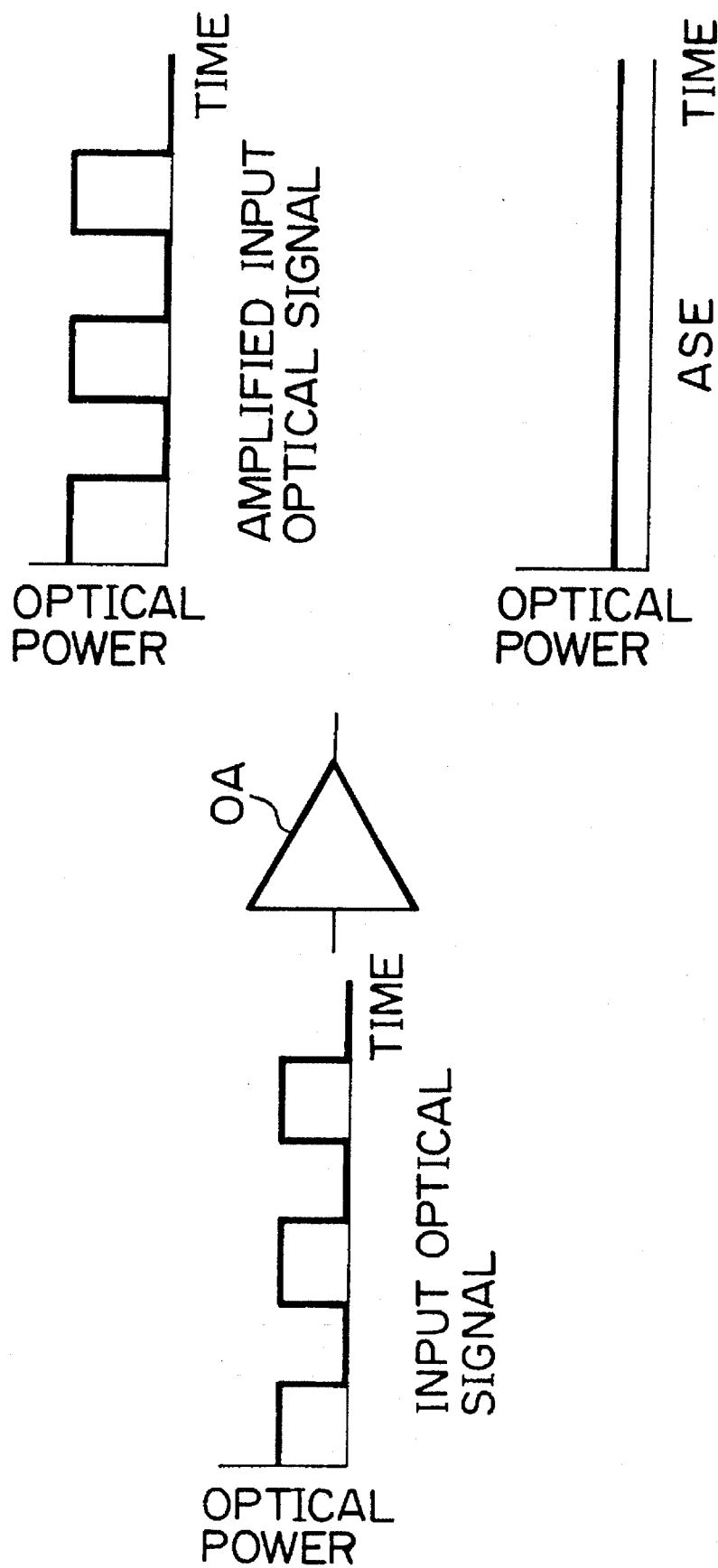
FIG. 12B is a wave form chart for explaining a variation of the $P_{ASE}$ when a high-speed modulated large signal is inputted in an optical amplifier under measurement.

FIG. 12A shows a variation of the ASE optical power when a small signal light at a high-speed modulation is inputted into the optical amplifier (OA), while FIG. 12B shows a variation of the ASE optical power when a large signal light at a high-speed modulation is inputted into the optical amplifier (OA).

In the case of testing the semiconductor optical amplifier, the life time ($t2eff$) of carriers thereof is on the order of under several nano seconds, so that the intensity-modulated light to be introduced into the OA under measurement should be in the range of over several gigahertz. Therefore it is preferable that the NF measurement be performed without depending on the level of the input light to be introduced into the OA under measurement. As shown in FIGS. 12A and 12B, this condition can only be satisfied by the NF measurement method in accordance with the present invention.

In the case of introducing light of extremely small power into the optical amplifier (OA), only a few ions transit from one state to another by means of stimulated emission. In this case, the condition of population inversion can be kept constant regardless of whether the OA receives the input or not, or whether the input is varied or not. Consequently, the ASE optical power of the output light corresponding to the space period of the amplified intensity-modulated light and the ASE optical power of the output light corresponding to the mark period of the amplified intensity-modulated light agree with each other.

Figure 12C:
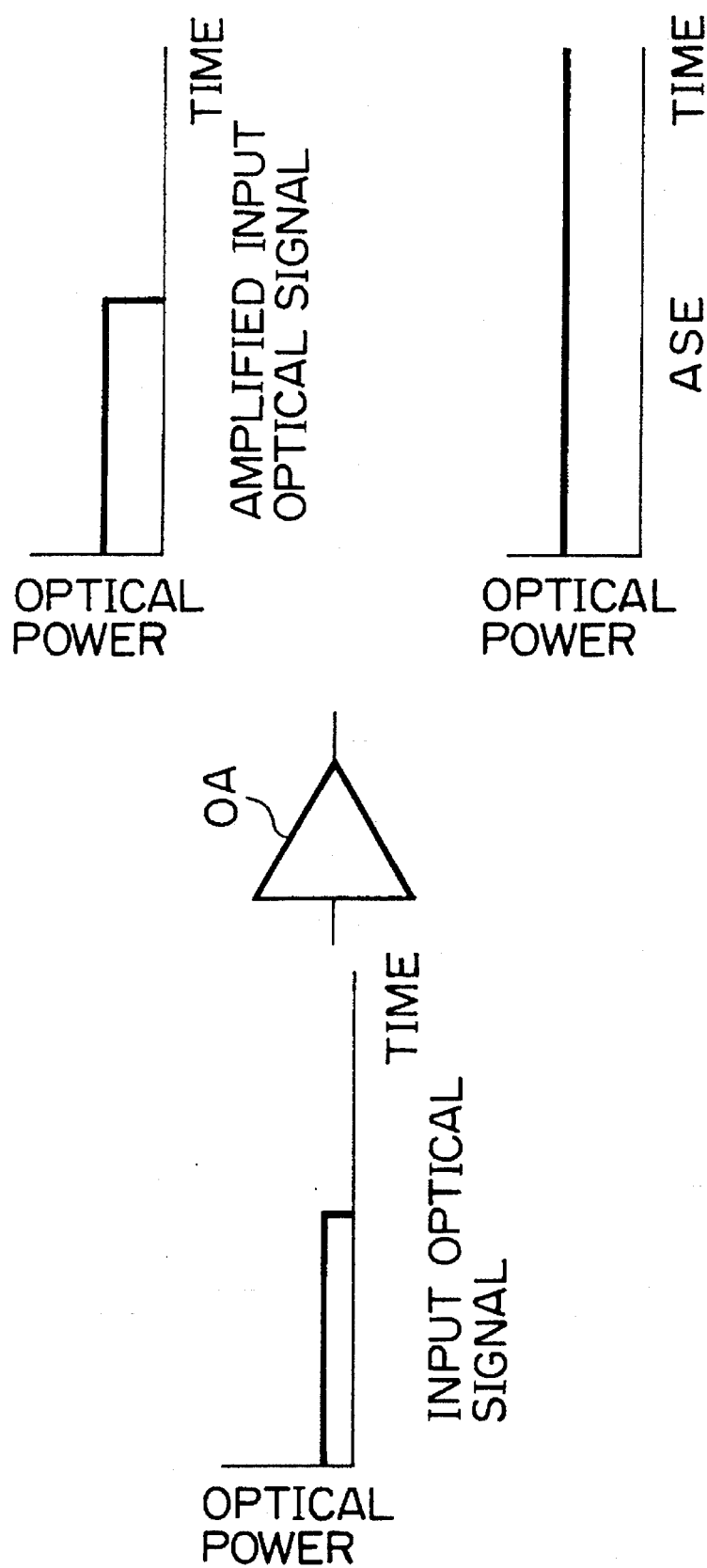
FIG. 12C is a wave form chart for explaining a variation of the $P_{ASE}$ when a low-speed modulated small signal is inputted in an optical amplifier under measurement.
Figure 12D:
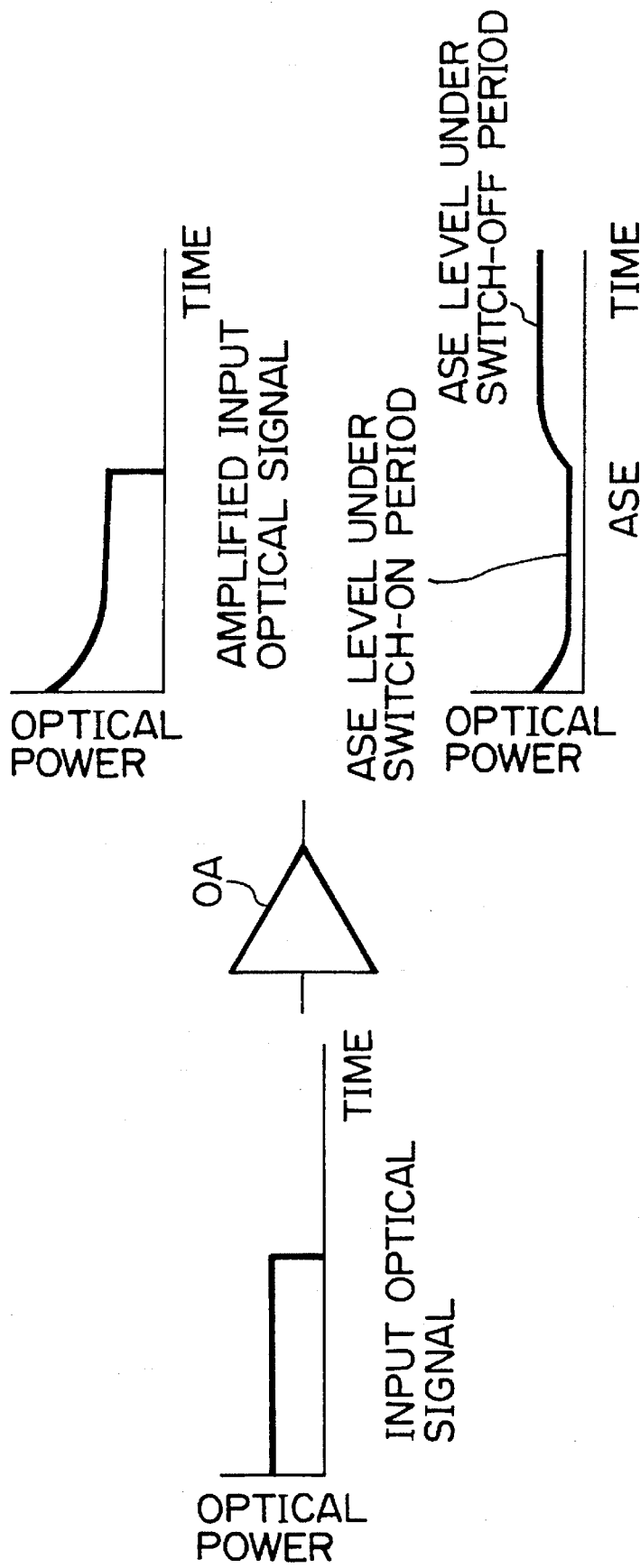
FIG. 12D is a wave form chart for explaining a variation of the $P_{ASE}$ when a low-speed modulated large signal is inputted in an optical amplifier under measurement.

FIG. 12C shows a variation of the $P_{ASE}$ level when the small signal light at a low-speed modulation is inputted into the optical amplifier, while FIG. 12D shows a variation of the ASE optical power when the large signal light at a low-speed modulation is inputted into the optical amplifier. As shown in FIG. 12D, a variation of the $P_{ASE}$ level can be observed when the large signal light at a low-speed modulation is inputted into the optical amplifier.

Hereinafter, we will explain concrete examples of the system for measuring noise figures of optical amplifiers, in accordance with the present invention.

Figure 13:
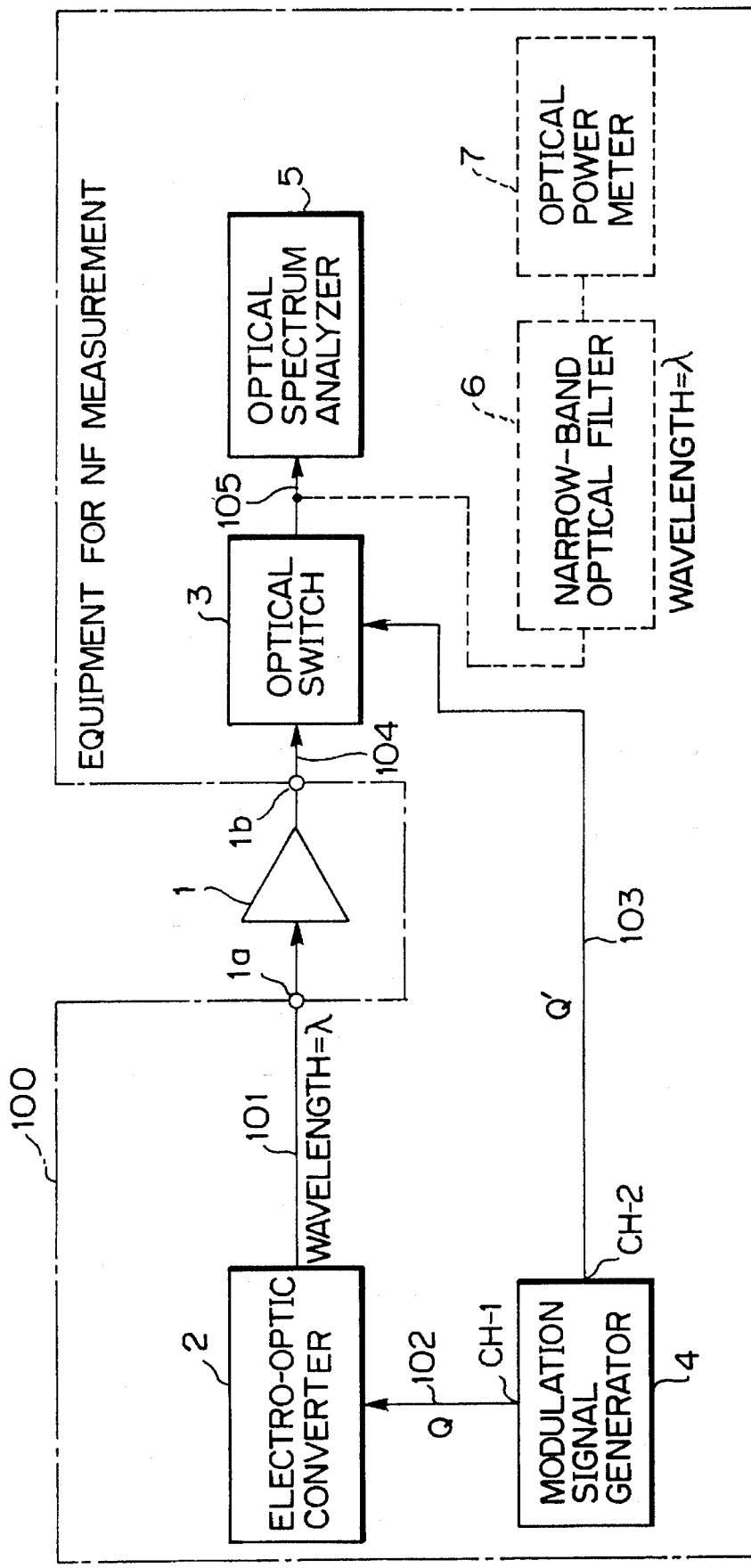
FIG. 13 is a schematic block diagram for explaining the basic setup and a first preferred embodiment of the NF measurement system in accordance with the present invention.

FIG. 13 is a schematic block diagram of the basic setup for explaining the NF measurement system in accordance with the present invention.

The NF measurement system 100 is composed of a source module, an optical sampling module, and an optical spectrum analyzer 5 (or a monitor module). The source module is for providing an input signal 101 into an optical amplifier (Er-doped optical fiber amplifier) (OA) 1 under measurement. In the source module, the input signal 101 is prepared by means of an intensity modulator so as to be modulated at a constant repetition rate which is sufficiently shorter than the metastable level life time of the OA 1 under measurement. The optical sampling module is responsible for sampling the $P_{AMP}$ level and the $P_{ASE}$ level, independently. The $P_{AMP}$ appears simultaneously with the mark period of switching the optical pulse signal 101, while the $P_{ASE}$ appears simultaneously with the space period of switching the optical pulse signal 101. Further, the optical spectrum analyzer 5 (or the monitor module) is responsible for detection of both the signal optical power level and the $P_{ASE}$ power level.

As shown in the figure, the source module comprises an electric-optic converter (hereinafter, referred to as an EO converter) 2 and a modulation signal generator 4. The EO converter 2 is constituted by a semiconductor laser device directly modulated by an electric pulse signal (Q) 102 from the modulation signal generator 4. The input signal 101 generated by the EO converter 2 is introduced into an input terminal 1a of the OA under measurement. Alternatively, the EO converter 2 may be composed of: a narrow-band optical source selected from a fixed-wavelength optical source and a wavelength-tunable optical source; and an optical switch, preferably an acousto-optic modulator.

The modulation signal generator 4 has two output channels, i.e., a first channel (CH-1) for connecting with the EO converter 2 and a second channel (CH-2) for connecting with an optical switch 3.

The optical sampling module comprises the optical switch 3 connected with an output terminal 1b of the OA under measurement. A function of the optical switch 3 is controlled by an electric signal (Q') 103 which is synchronized with the electric pulse signal (Q) 102 generated from the modulation signal generator 4. An output signal 104 from the OA under measurement passes through the optical switch 3 during the period of measuring its power level with a guard timing.

Furthermore, the monitor module as shown in a dashed region of FIG. 13 may be used instead of the optical spectrum analyzer 5. For example, the module employs a narrow band wave filter 6 and an optical power meter 7.

A NF level of the OA under measurement can be obtained from the following equation (1) by substituting the $P_{ASE}$ level (on a peak power basis).

$$NF = \frac{P_{ASE}(\text{peak value})}{h_v G B_0} + \frac{1}{G} \quad (1)$$

wherein $P_{ASE}$ is the $P_{ASE}$ power level of the optical wavelength outputted from the OA under measurement; Bo is the optical band width of the device for measuring the $P_{ASE}$ level; G is the gain of the OA under measurement, h is the Plank constant; v is the optical frequency of signal light.

For detecting the $P_{AMP}$ power and the $P_{ASE}$ power separately, an optical power detector may be used in the NF measurement system. In this case, the detector is characterized by its transmitted central wavelength which correspond to a central wavelength ($\lambda$) of the optical pulse signal to be provided into the OA under measurement and also it is characterized by its band width of $B_o$.

The gain G response of the OA under measurement can be obtained from the following equation (2) where $P_{Input}$ (on a peak power basis) stands for the optical power level of an intensity-modulated light to be provided into the OA under measurement.

$$G \cong \frac{P_{AMP}(\text{peak value}) - P_{ASE}(\text{peak value})}{P_{Input}(\text{peak value})} \quad (2)$$

Alternatively, the Gain G can be obtained from the following equation (3):

$$G = \sqrt{\frac{P_{AMP-E}}{P_{IN-E}}} \qquad (3)$$

where $P_{IN-E}$ stands for the component of an intensity-modulation light obtained by converting an optical pulse signal to be provided into the OA under measurement into an electric signal, and $P_{AMP-E}$ stands for the component of an intensity-modulation light obtained by converting an output light of the OA under measurement.

Figure 4:
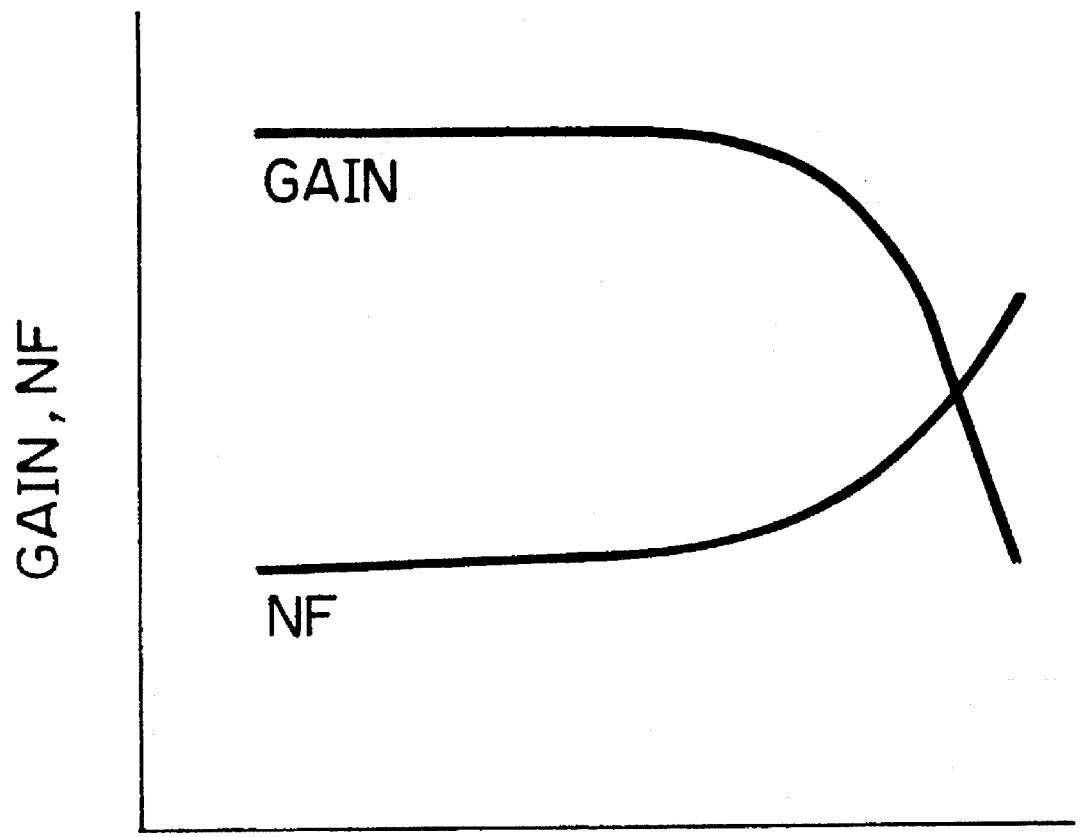
FIG. 4 is a graphical representation of the relationship between an input optical power level and variations in gain and NF.
Figure 5:
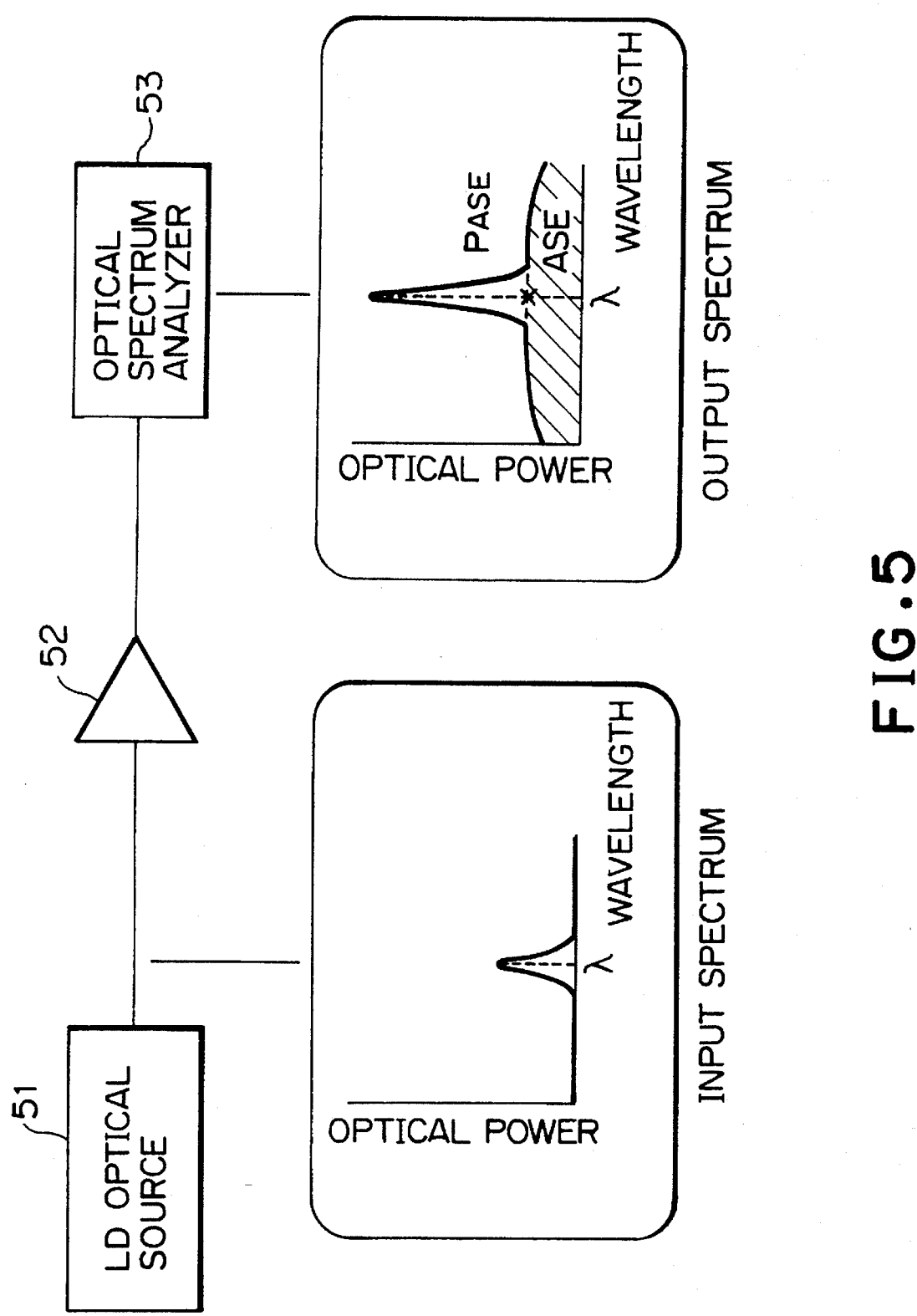
FIG. 5 is a schematic block diagram with a wave form for explaining the setup for the conventional optical spectrum analyzer method of making an NF measurement.
Figure 6:
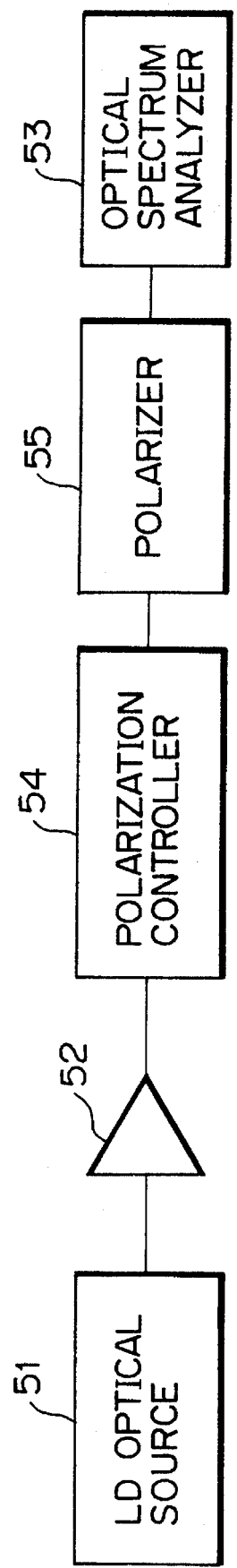
FIG. 6 is a schematic block diagram for explaining the setup for the conventional polarization test method of making an NF measurement.

By the way, a typical Er-doped optical fiber amplifier has a characteristic noise figure (NF). The NF value varies according to the input light power level as shown in FIG. 4. In the present invention, it is easy to determine the $P_{ASE}$ level from the ASE optical power. The ASE optical power is a part of the output from the Er-doped optical fiber amplifier and corresponds to the space period of the intensity-modulated light, where the measurement is made over several tens of kHz. In the case of testing a semiconductor optical amplifier, on the other hand, the intensity of the input light may be modulated over a few gigahertz because the mean life of the carriers ($\tau 2eff$) is in the range of under a few nanoseconds. Then the characteristics of the optical amplifier under measurement can be obtained by determining each NF value at various optical power levels of the intensity-modulated light.

EXAMPLE 1

In the following description, one of the preferred embodiment of the NF measurement system in accordance with the present invention will be explained in detail, referring to FIGS. 13 and 14(a)–14(e). FIGS. 14(a)–14(e) constitute a wave form chart for explaining each signal wave form for driving the system shown in FIG. 13.

The NF measurement system of the present example is, as shown in FIG. 13 and as already explained in the above description, composed of: electric-optic converter 2 for providing an input light 101 of a constant wavelength λ to an input terminal 1a of an optical amplifier (OA) 1 under measurement; an optical switch 3 to be connected with an output circuit of the OA under measurement to be controlled by an electric signal (Q') 103 in synchronization with an electric pulse signal (Q) 102; a modulation signal generator 4 for outputting the electric signal (Q') 103 to the optical switch 3; and an optical spectrum analyzer 5 for measuring an output 105 produced from the optical switch 3. In this example, the optical switch 3 consists of a single acousto-optic modulator (AOM).

In this example, an Er-doped optical fiber amplifier (OFA) 1 is used for the measurement. This optical amplifier 1 has a mean life ($\tau 2eff$) in the range of 0.2 to several tens of milliseconds. Though a modulation frequency of 10 kHz is enough to perform the measurement, the present example employs a frequency of 1 MHz.

The modulation signal generator 4 generates electrical pulsed signals Q and Q' with a phase difference of 180° therebetween. The pulsed signal Q is transmitted to the electro-optic converter 2 by way of a first channel (CH1), while the pulsed signal Q' is transmitted to the optical switch 3 by way of a second channel (CH2).

The electro-optical converter 2 generates a rectangular on-off input signal 101 with a repetition rate of 1 MHz by directly modulating an optical source (semiconductor laser) in accordance with the output pulsed signal Q transmitted from the modulation signal generator 4. The modulated input light 101 is propagated into the optical amplifier 1 and amplified thereby. Therefore, the output light 104 generated from the optical amplifier 1 at the time of introducing the input light 101 is the sum of the amplified input light and the ASE optical power. After that, the output light 104 is introduced into the optical switch 3.

The optical switch 3 is switched on-off by means of the output (i.e., an electrical pulsed signal with a 180° phase shift against the electrical pulsed signal Q) Q' provided from the modulation signal generator 4. That is, the optical switch 3 is activated by receiving the electrical pulsed signal Q' and inactivated by the disappearance of the electrical pulsed signal Q'. Furthermore, there is a phase difference of 180° between the electrical modulation signals, Q and Q', so that the optical switch 3 only transmits an output part 105 corresponding to the period during which the space portion of the amplified optical pulsed signal is received, and does not transmit an output part when the mark portion of the amplified optical pulsed signal is received. Therefore, only the ASE light 105 can be output from the optical switch 3.

An optical spectrum (ASE light) without the amplified signal light can be observed by introducing the output 105 of the optical switch 3 into the optical analyzer 5. Also, an ASE optical power ($P_{ASE}$) level can be determined from the resulting optical spectrum. Instead of using the optical spectrum analyzer 5, furthermore, it is possible to use a step of a narrow band width filter 6 and an optical power meter 7 as indicated by a region indicated by a broken line in FIG. 13 to determine the $P_{ASE}$ level.

Furthermore, the $P_{AMP}$ level can be determined by passing a light part corresponding to the amplified optical pulsed signal through the optical switch 3 by changing the driving phase of the optical switch 3. Still furthermore, the gain G can be calculated from the $P_{AMP}$ level and the $P_{ASE}$ level.

Figure 15A:
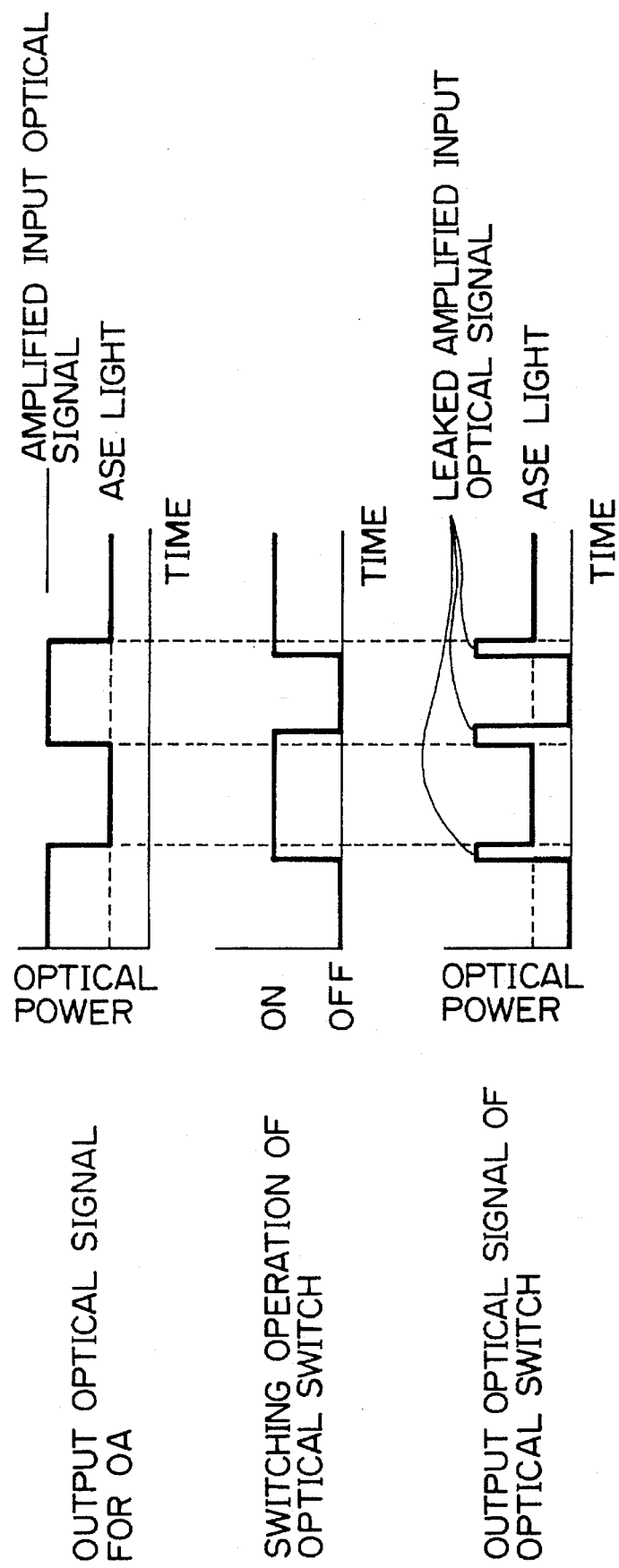
FIG. 15A is a wave form chart for explaining an output light wave form when the period of actuating an optical switch is longer than that of the space period of the input pulse light.
Figure 15B:
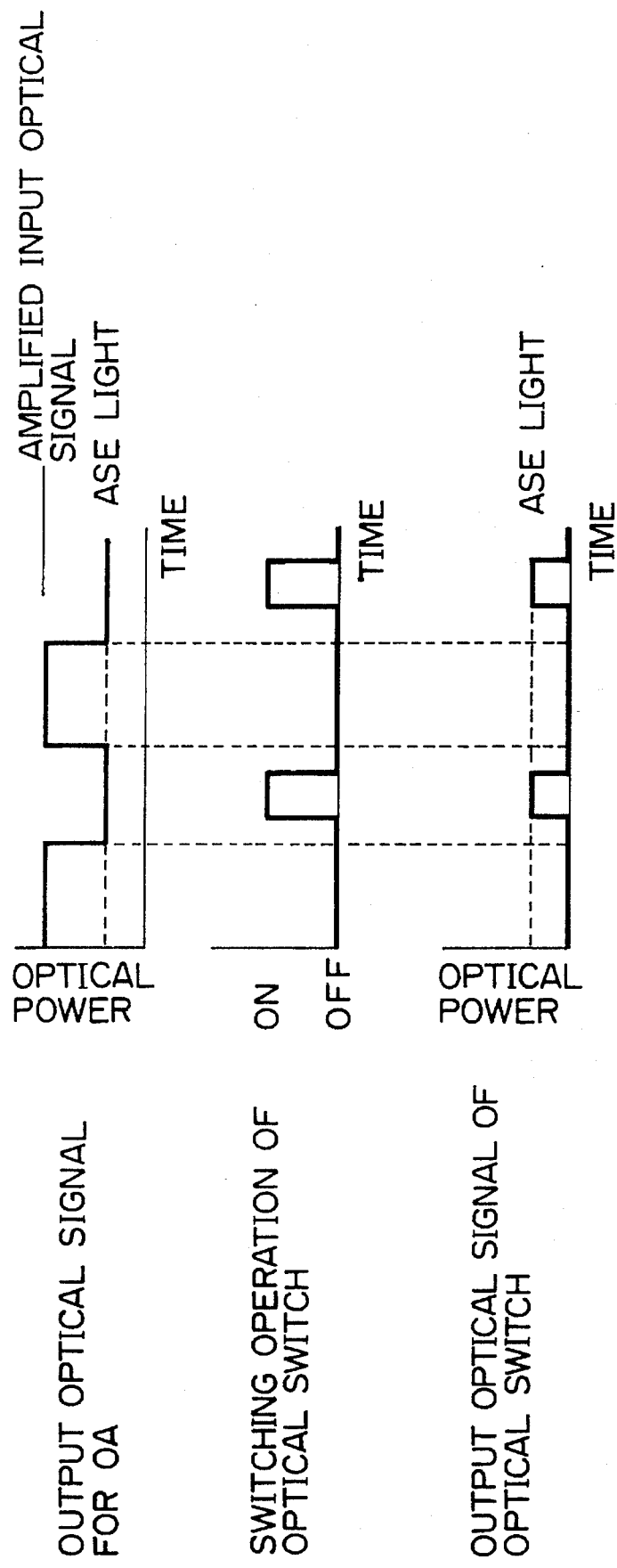
FIG. 15B is a wave form chart for explaining an output light wave form when the period of actuating an optical switch is shorter than that of the space period of the input pulse light.

As the modulation signals Q and Q' are 180° out of phase with each other, there is a possibility that the amplified input light may leak into the output of the optical switch 3 when the modulation signals Q and Q' are not perfectly aligned, or at least parts of the pulses of one signal will overlap upon parts of other pulses as shown in FIGS. 15A and 15B.

In the case that the period of the optical switch on is longer than the emitting period of the input light, as shown in FIG. 15A, a part of the amplified input light is leaked toward the output terminal. In the case that the period of the optical switch on is shorter than the space period of the input light by means of setting a guard-time, as shown in FIG. 15B, the amplified input light is not leaked into the output of the optical switch 3 in spite of occurring a little out of synchronization between the signals Q and Q'. Consequently, it is desirable that the operation duty of the optical switch 3 should be set at a level of less than 50% for determining the ASE light level, exactly.

As explained above, the first preferred embodiment takes note of the metastable level life time of the optical amplifier. In the first preferred embodiment, the $P_{ASE}$ level can be determined without being influenced by the amplified input light because of the following reason. That is, the optical switch selects a part corresponding to the space period of the input signal from the whole output of the optical amplifier that receives the input light modulated with a period which is much shorter than the metastable level life time of the optical amplifier. Consequently, the NF level can be easily determined by the system of the first preferred embodiment in accordance with the present invention.

EXAMPLE 2

Figure 16:
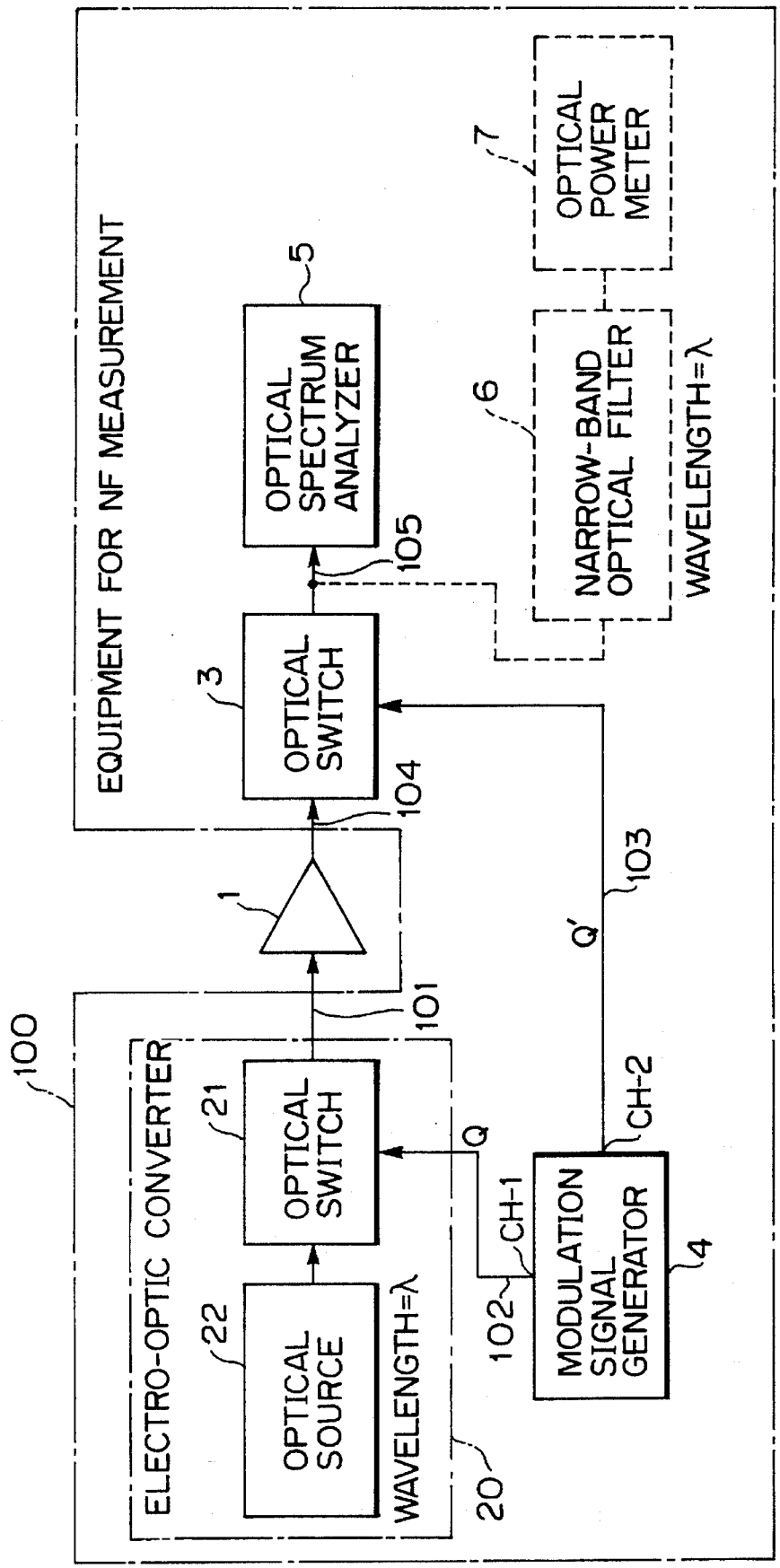
FIG. 16 is a schematic block diagram for explaining the basic setup and a second preferred embodiment of the NF measurement system in accordance with the present invention.

FIG. 16 is a schematic view of a second preferred embodiment of the noise figure measurement system in accordance with the present invention.

The NF measurement system 100 of the present example has the same constitution as that of example 1 except the following matters. The system of the present invention comprises an optical source 22 for emitting a continuous light and an optical switch 21 for converting the continuous light into an optical pulsed signal, which are used as an electro-optical converter 20. As in the case of optical switch 3, the optical switch 21 used in the present example consists of an acousto-optic element, preferably a series of acousto-optic elements arranged in a line.

Figure 17A:
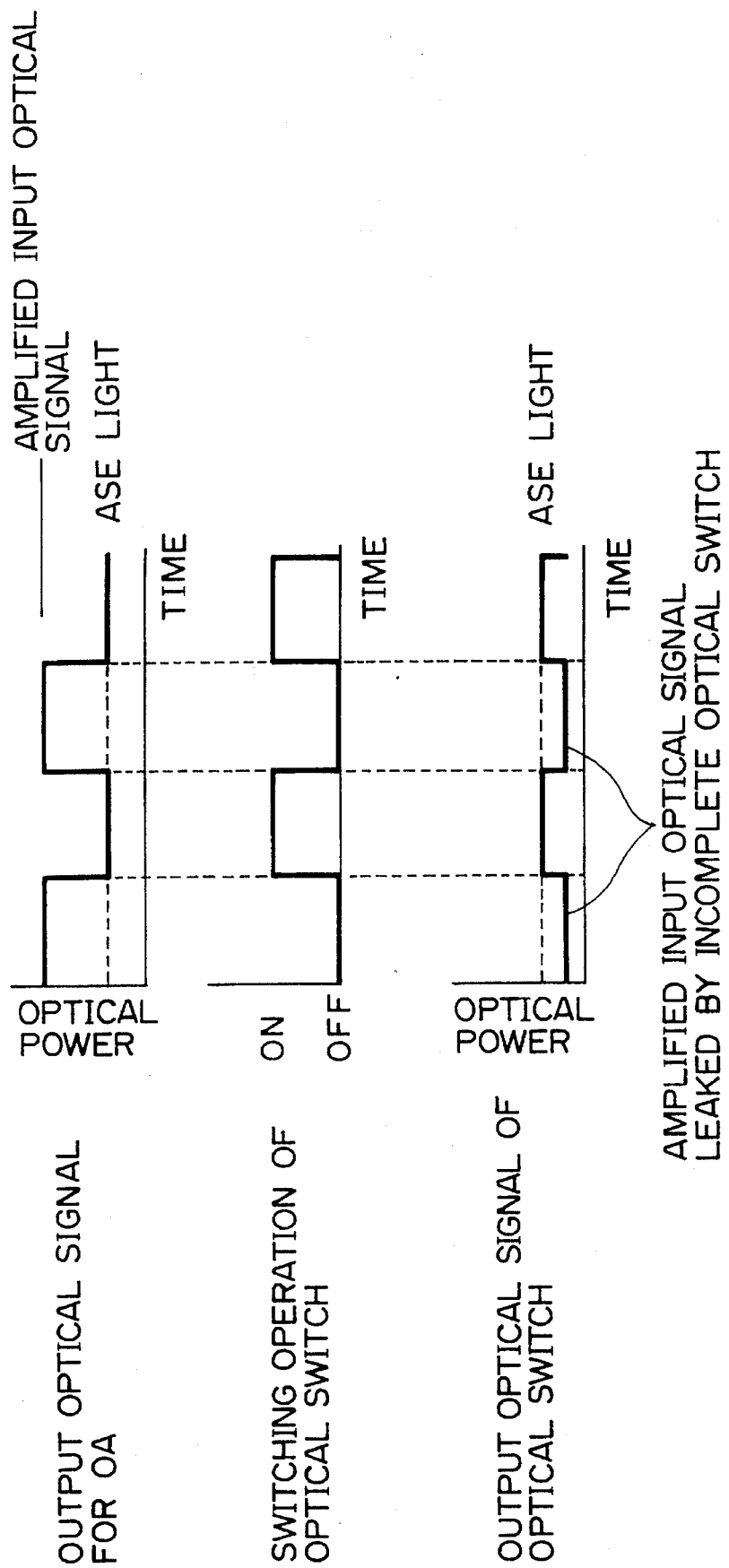
FIG. 17A is a wave form chart for explaining an output light wave form of the optical switch, in which an amplified input light is leaked into the output light by an incomplete optical switch.

In the NF measurement system of the present example, the optical switch 3 is driven by a modulation signal (Q') 103 which is a 180° out-of-phase signal compared with the input modulated light. In this case, amplified light for the measurement corresponding to the space period passes through the optical switch 3, while amplified light for the measurement corresponding to the mark period does not pass through the optical switch 3. If the optical switch 3 permits transmission of amplified light corresponding to the mark period because of incomplete isolation properties of the optical switch 3, there is a possibility that the amplified input light will leak into the output of the optical switch 3. In this case, an output light wave form of the optical switch 3 can be observed as shown in FIG. 17A. In the figure, the output light wave form includes a wave form of the amplified input light leaked into the output by means of incomplete isolation properties of the optical switch 3. Therefore, the $P_{ASE}$ level thus obtained has an error within a certain range. If the optical switch isolation for the measurement is not obtained sufficiently, furthermore, the optical power corresponding to the space period of the optical pulsed signal contains the amplified light power, so that the $P_{ASE}$ level thus obtained also has an error within a certain range.

Figure 17B:
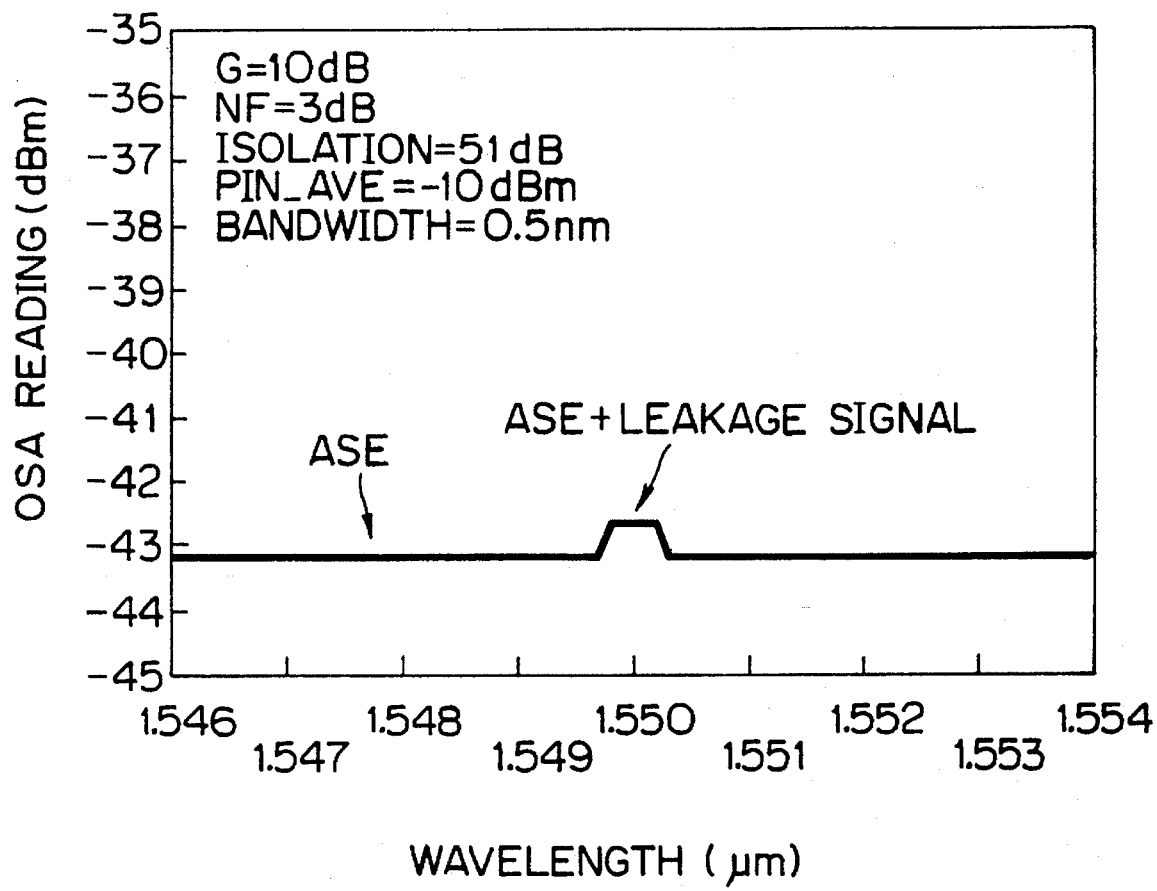
FIG. 17B is a wave form chart for explaining the results in a calculation for determining ASE spectrum characteristics in accordance with the NF measurement in accordance with the present invention, in which an amplified input light is leaked into the output light by an incomplete optical switch.

FIG. 17B shows an example of measuring spectrum characteristics of the $P_{ASE}$ when the optical switch has a leakage of 51 dB. The signal wavelength has an error of about 0.5 dB because of leakage of the signal light. If it is possible to use the optical spectrum analyzer, therefore, the accuracy of the NF measurement may be improved by estimating the $P_{ASE}$ level at the signal light wavelength by compensating for the ASE optical power measured by an interpolation technique.

A leakage characteristic of the typical acousto-optic element takes a value of approximately 50 dB, so that an optical switch having a leakage characteristic of approximately 100 dB can be obtained by simultaneously operating two elements placed in series. As for the optical switches 3 and 21 shown in FIG. 16, consequently, the NF measurement system comprises two acousto-optic elements in series.

EXAMPLE 3

Figure 18:
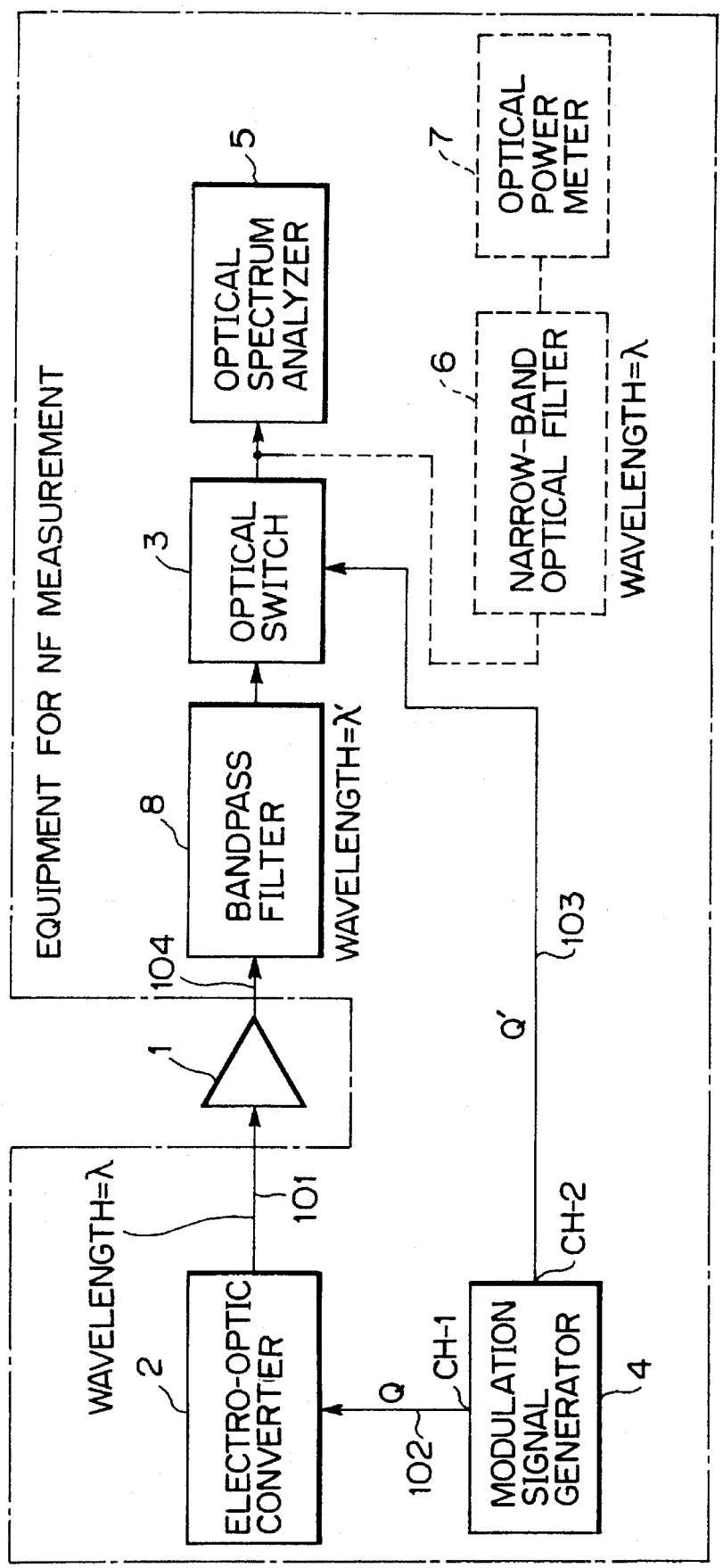
FIG. 18 is a schematic block diagram for explaining the basic setup and a third preferred embodiment of the NF measurement system in accordance with the present invention.

FIG. 18 is a schematic block diagram of a third preferred embodiment of the noise figure measurement system in accordance with the present invention.

The NF measurement system of the present example has the same constitution as that of example 1 except for the following matters. In the system of the present example, a band-pass filter 8 is placed in front of the input side of the optical switch 3. The band-pass filter 8 transmits a band of wavelength λ' which is different from a band of wavelength λ of the optical pulsed signal. However, the wavelengths λ and λ' are close to each other.

If the leakage characteristic of the optical switch 3 is insufficient as explained in the second preferred embodiment, an error can occur in the $P_{ASE}$ measurement value. In the present example, the band-pass filter 8 having a central wavelength λ' is placed in front of the input terminal of the optical switch 3 so as to maintain a lower leakage of the optical pulsed signal. Thus the NF level can be obtained with precision within the specified limits. That is, the level of the amplified signal to be introduced into the optical switch 3 can be lowered by placing the band-pass filter 8 in the system because it transmits a band of wavelength λ' different from the wavelength λ of the optical pulsed signal. Consequently, the optical switch, in spite of having poor switching properties cannot pass an output signal corresponding to the mark period of the amplified signal pulse. Though a loss of $P_{ASE}$ level is produced by the band-pass filter 8 having a central wavelength λ', an initial calibration make it possible to compensate for decreases in the $P_{ASE}$ level because the loss remains invariant.

In accordance with the present example, therefore, it is possible to obtain a NF level with a neglectable error by using the band-pass filter.

EXAMPLE 4

Figure 19:
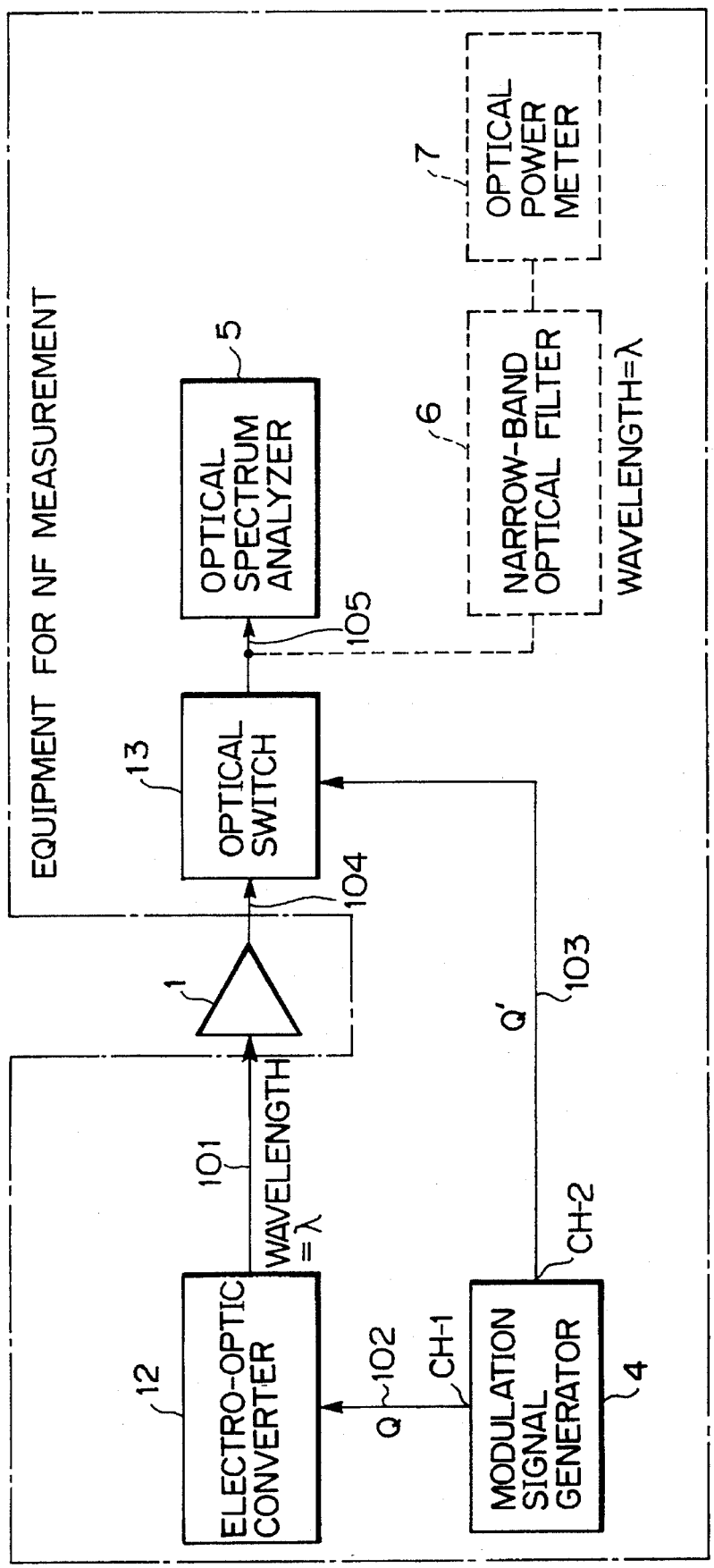
FIG. 19 is a schematic block diagram for explaining the basic setup and a fourth preferred embodiment of the NF measurement system in accordance with the present invention.

FIG. 19 is a schematic block diagram of a fourth preferred embodiment of the noise figure measurement system in accordance with the present invention. The NF measurement system of the present example has the same constitution as that of example 1 (FIG. 13) except for the following matters. In this example, an optical amplifier (OA) 1 under measurement is a semiconductor laser amplifier. In general the semiconductor laser amplifier has a much shorter metastable level life time compared with that of the rare earth doped fiber amplifier, so that a repetition rate of the optical pulsed signal should be set at 1 GHz or more. That is, the modulation frequency of the optical pulsed signal should be on the order of a few GHz because the mean life of carriers ($\tau 2$eff) is a few nanosecond or less. Hence the NF measurement system can be embodied by using a $LiNbO_3$ optical switch as an electro-optic converter 12 and an absorb-type optical modulator as an optical switch 13 because their actuation band width is a few tens of gigahertz.

In this example, therefore, the NF system of the present example comprises the $LiNbO_3$ optical modulator (i.e., the electro-optical converter) 12 and the absorb-type optical modulator (i.e., the optical switch) 13, and also a light beam with a modulation frequency of 10 GHz is used as a measurement light.

In the electro-optic converter 12, an output light (CW light) of the semiconductor laser being oscillated with a constant optical power is driven by a modulation signal (Q) 102 provided from the modulation signal generator 4. That is, the $LiNbO_3$ optical modulator externally modulates the CW light by the modulation signal Q from its output channel CH-1 to generate an input light 101 with a modulation frequency of 10 GHz. Furthermore, the $LiNbO_3$ optical modulator externally operates the optical switch 13 by another modulation signal Q' through another output channel CH-2.

In accordance with the present example, therefore, it is possible to obtain a NF level with a neglectable error.

EXAMPLE 5

Figure 20:
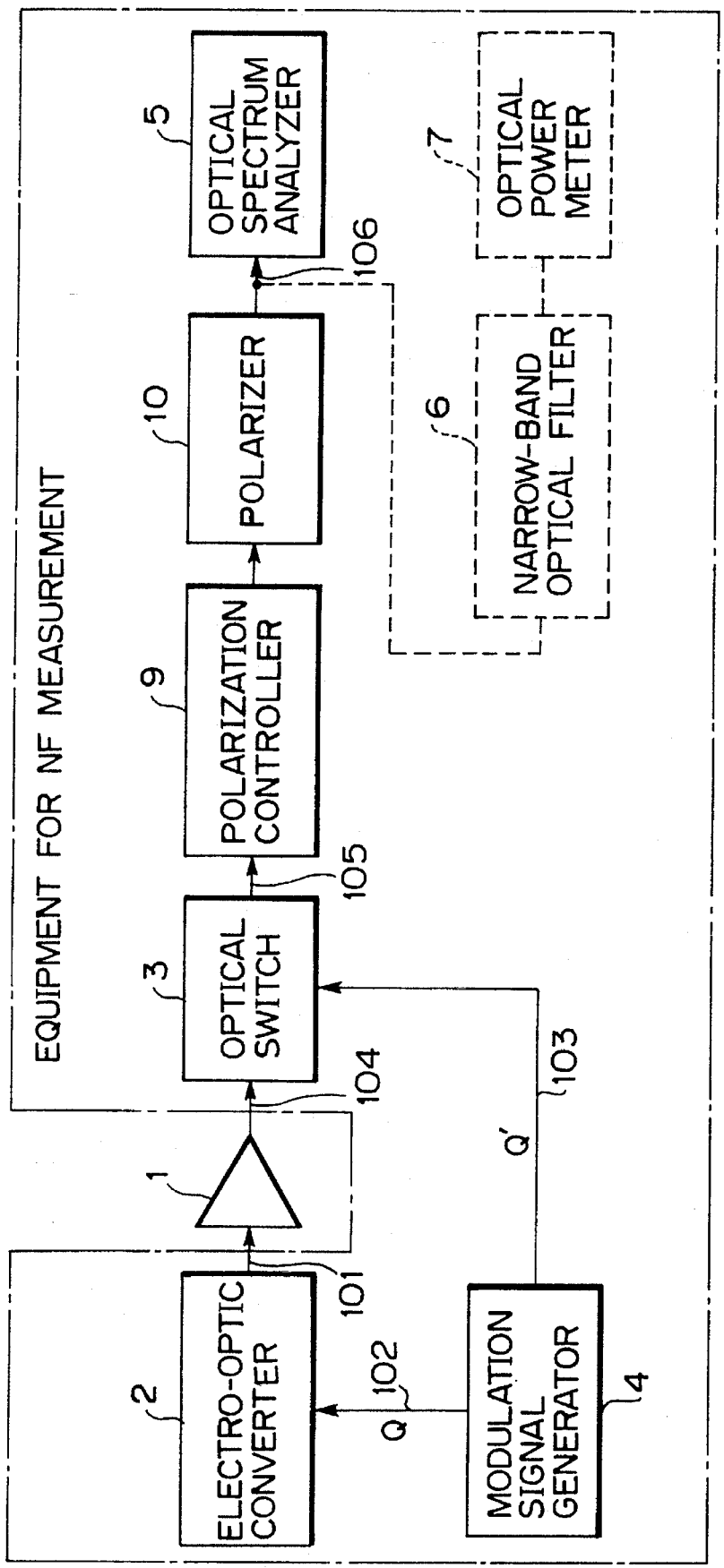
FIG. 20 is a schematic block diagram for explaining the basic setup and a fifth preferred embodiment of the NF measurement system in accordance with the present invention.

FIG. 20 is a schematic block diagram of a fifth preferred embodiment of the noise figure measurement system in accordance with the present invention. The NF measurement system of the present example has the same constitution as that of example 1 (FIG. 13) except for the following matters. In this example, that is, a polarization controller 9 and a polarizer 10 are placed between an output side of the optical switch and the optical spectrum analyzer (or the monitor module). These devices are responsible for separating and detecting two different output powers. That is, a first output power is coincident with a polarized plane of the amplified input optical pulsed signal 101 and is in synchronization with a mark period of such signal 101, while a second output power is coincident with the polarized plane of the amplified input optical pulsed signal 101 and is in synchronization with a space period of signal 101. The optical amplifier under measurement is polarization-dependent, so that the NF level corresponding to the polarized plane of the amplified object light portion of the whole output can be determined.

Hereinafter, we are going to explain an operation of the NF measurement system of the present example. The electro-optic converter 2 and the optical switch 3 are driven simultaneously with each other by the outputs Q and Q' of the modulation signal generator 4 respectively, and then an amplified input light and an ASE light are generated as the output 105 from the optical switch 3. The polarization controller 9 receives the amplified input light from the optical switch 3 so as to maximally modulate its intensity. It is easy to adjust a setting of the polarization controller 9 for obtaining the maximum intensity of the amplified input light. However, the minimum one can be hardly obtained. By adjusting the setting of the polarization controller 9, the output light 106 passing through the polarizer 10 is obtained as the sum of the amplified input light and the ASE light coincident with a polarized plane thereof. Therefore, the gain of the optical amplifier under test can be obtained from the $P_{AMP}$ level corresponding to the emitting period of the intensity-modulated input light indicated by equation (2) by compensating for the transmission loss of each of the polarization controller 9 and the polarizer 10.

In the case of driving the electro-optical converter 2 by the output Q of the modulated signal generator 4 and also driving the optical switch 3 by the output Q' from the same, the amplified input light can be eliminated from the output 106. In this case, consequently, the output is only composed of the ASE light corresponding to the polarized plane of the amplified light The $p^{PL}_{ASE}$ level can be also obtained from the ASE light by compensating each transmission loss of polarization controller 9 and polarizer 10. In this way, it is easy to determine the NF level corresponding to the polarized plane of the amplified input light in the optical amplifier that has a dependence on polarization.

In general, furthermore, the rare earth doped optical fiber does not depend on a polarization against an amplification to be caused in the optical fiber. Accordingly, a polarization-independent optical amplifier can be made up from a combination of: polarization-independent components such as an optical isolator and an optical filter; and a rare-earth doped optical fiber. Currently, there has been considerable work devoted to preparing the Er-doped optical fiber. Currently, there has been considerable work devoted to preparing the Er-doped optical amplifier which is one of the polarization-independent amplifiers. In addition, an optical amplifier having a polarization dependence on an amplification phenomena can be made up by using a polarization-dependent optical fiber, such as a PANDA optical fiber, having a core doped with a rare-earth element.

In the case of preparing a semiconductor optical amplifier, most of the prepared elements are polarization dependent because it is difficult to obtain an active layer having a uniform thickness and width for optical amplification. In these polarization-dependent optical amplifier, therefore, the gain and the output optical power can be varied by the polarized plane of the input light and also the ASE light can be varied by the output polarized plane. Consequently, it is required to measure the gain and the ASE level corresponding to the polarized plane of the amplified measurement light for measuring a NF value of the polarization-dependent optical amplifier.

EXAMPLE 6

Figure 21:
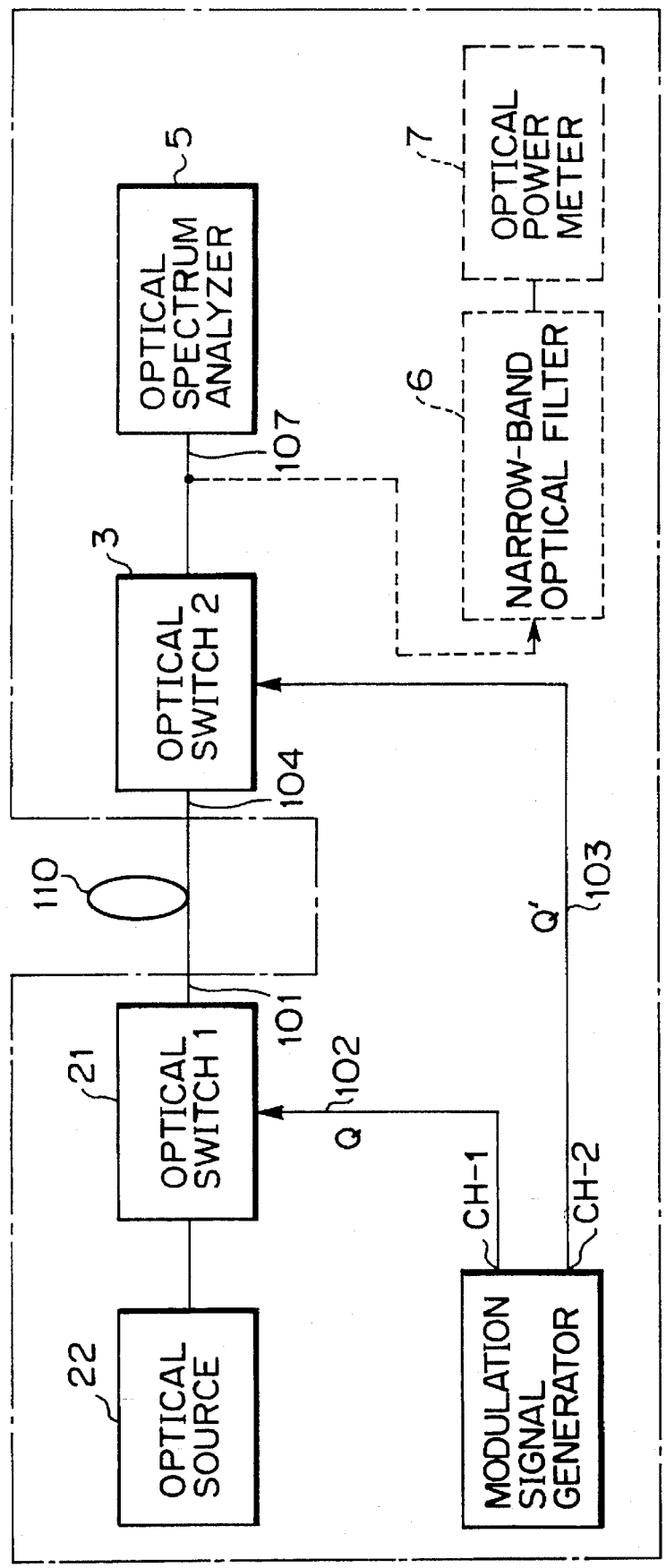
FIG. 21 is a schematic block diagram for explaining the basic calibration of the NF measurement system in accordance with the present invention.

FIG. 21 shows a schematic block diagram of the setup for calibration of the noise figure measurement system in accordance with the present invention for improving the accuracy of the NF measurement when the optical switch shows poor leakage properties. In this example, the calibration set up is in the same as that of the example 2 (FIG. 16) except that a passive optical component such as an optical fiber cord which does not emit ASE light is used as a device for connecting between an input terminal and an output terminal of the measurement device to perform an initial calibration of the leakage light.

According to the present example, the calibration process includes the steps of adjusting the phase of the optical switch for measuring an output optical power $P_{out}$ (time average value) generated from the passive optical component; and re-adjusting the phase of the optical switch in the same manner as that of the ASE light measurement for measuring the leakage power $P_{leakage}$ (time average value) of the signal light power. These results are incorporated into the following equation to determine the leakage characteristic value Iso.

$$\text{Iso} \cong \frac{P_{leakage}(\text{time averaged value})}{P_{out}(\text{time averaged value})}$$

Then the ASE optical power with a calibration of the leakage power ($P_{ASE}^{calibrated}$) is calculated by the following equation.

$$P_{ASE}^{calibrated} = P_{ASE}(\text{peak value}) - \text{ISO} \cdot P_{AMP}(\text{peak value})$$

The resulting $P_{ASE}^{calibrated}$ value is used instead of the $P_{ASE}$ in equation (1) to compensate for the effect of the leakage light for determining a noise figure characteristic of the optical amplifier.

It will be obvious to those skilled in that art that the above features are not only adapted in the setup of example 2 but also adapted in that of the other examples.

Accordingly, the described invention provides a novel measurement method and a system therefor for determining a noise figure of an optical amplifier with precision, including determination of the noise figure by making a series of large scale automatic measurements. The results obtained do not tend to vary with each observer. Therefore, the noise figure can be used as a criterion of assessment for readily determining whether the optical amplifier has failed or not, and also used as a parameter for examining products and their deterioration with time. According to the present invention, furthermore, all of the optical amplifiers to be installed in an optical communication net work can be readily tested, so that it is possible to design the noise performance of the net work including transmission paths and optical switches.

The present invention has been described in detail with respect to preferred embodiments, and it will now be seen that changes and modifications may be made without departing from the invention in its broader aspects, and it is the intention, therefore, in the appended claims to cover all such changes and modifications as fall within the true spirit of the invention.

What is claimed:

1. A method of measuring noise power of an optical amplifier, comprising the steps of:

generating an optical pulsed signal by modulating an intensity of a continuous wave light beam, said optical pulsed signal having a repetition rate with a period shorter than a life time of carriers or a life time of ions in a metastable level of the optical amplifier under measurement, the optical pulsed signal having mark portions wherein light is generated and space portions wherein light is not generated, said space portions being interposed between said mark portions;

applying said optical pulsed signal to an input of the optical amplifier, an amplified optical pulse signal having said space and mark portions generated at an output of the optical amplifier;

detecting amplified spontaneous emission power ($P_{ASE}$) at the output of the optical amplifier during space portions of said amplified optical pulsed signal; and detecting amplified optical signal power ($P_{AMP}$) at the output of the optical amplifier during mark portions of said amplified optical pulsed signal.

2. A method as claimed in claim 1, wherein a noise figure for the optical amplifier under measurement is obtained by an equation:

$$NF = \frac{P_{ASE}(\text{peak value})}{h_\nu G B_0} + \frac{1}{G}$$

where NF is the noise figure; $P_{ASE}$ (peak value) is a peak value of said amplified spontaneous emission power ($P_{ASE}$); $B_o$ is an optical bandwidth when a level of said output power $P_{ASE}$ is measured; G is a gain of said optical amplifier; h is Planck's constant; and $\nu$ is an optical frequency of said optical pulsed signal.

3. A method as claimed in claim 1, which comprises the further steps of:

replacing said optical amplifier with a passive optical component which does not generate amplified spontaneous emission (ASE);

applying said optical pulsed signal to an input of said passive optical component;

detecting a time averaged value of unwanted leakage power ($P_{leakage}$) during the space portion of the optical pulsed signal transmitted through said passive optical component;

detecting a time averaged value of an optical pulsed signal power ($P_{OUT}$) during the mark portion of the optical pulsed signal transmitted through said passive optical component; and performing a quantitative determination of a leakage characteristic ($I_{so}$) of the measurement system by an equation:

$$Iso \cong \frac{P_{leakage}(\text{time averaged value})}{P_{out}(\text{time averaged value})}$$

4. A method as claimed in claim 3, comprising the further steps of:

calculating a calibrated ASE power ($P_{ASE}^{calibrated}$) by an equation:

$$P_{ASE}^{calibrated} = P_{ASE}(\text{peak value}) - ISO \cdot P_{AMP}(\text{peak value});$$

and calculating a noise figure for the optical amplifier under measurement by an equation:

$$NF = \frac{P_{ASE}^{calibrated}}{h_\nu G B_0} + \frac{1}{G}$$

where NF is the noise figure; $B_o$ is an optical bandwidth when a level of said output power $P_{ASE}$ is measured; G is a gain of said optical amplifier; h is Planck's constant; and $\nu$ is an optical frequency of said optical pulsed signal, whereby the calculated value of said noise figure is compensated for leakage light.

5. A method as claimed in claim 2, wherein said detecting steps are carried out by providing an optical power detector having said optical bandwidth of $B_o$ and a center wavelength corresponding to a center wavelength of said optical pulsed signal.

6. A method as claimed in claim 2, wherein the gain G of said optical amplifier is obtained from an equation:

$$G \cong \frac{P_{AMP}(\text{peak value}) - P_{ASE}(\text{peak value})}{P_{Input}(\text{peak value})}$$

where $P_{INPUT}$ (peak value) is the peak value of the optical power of said optical pulsed signal, $P_{AMP}$ (peak value) is the peak value of the amplified optical signal power $P_{AMP}$, and $P_{ASE}$ (peak value) is the peak value of the amplified spontaneous emission power $P_{ASE}$.

7. A method as claimed in claim 2, wherein the gain G of said optical amplifier is obtained from an equation:

$$G = \sqrt{\frac{P_{AMP-E}}{P_{IN-E}}}$$

where $P_{IN-E}$ is a main power spectrum component of a first electrical signal obtained by converting said optical pulsed signal into said first electrical signal; and $P_{AMP-E}$ is a main power spectrum component of a second electrical signal obtained by converting said amplified optical pulsed signal into said second electrical signal.

8. A method as claimed in claim 1, wherein said step of generating an optical pulsed signal is performed by a semiconductor laser driven by an electrical pulsed signal.

9. A method as claimed in claim 1, wherein said step of generating an optical pulsed signal is performed by passing an output light generated from a continuous wave optical source through an optical switch driven by an electrical pulsed signal.

10. A method as claimed in claim 2, wherein the separate steps of detecting amplified spontaneous emission power ($P_{ASE}$) at the output of the optical amplifier during space portions of said amplified optical pulsed signal, and detecting amplified optical signal power ($P_{AMP}$) at the output of the optical amplifier during mark portions of said amplified optical pulsed signal are performed by an optical switch driven by a pulsed signal synchronized with said optical pulsed signal.

11. A method as claimed in claim 10, wherein said optical switch performing said detecting steps is an acousto-optical switch.

12. A method as claimed in claim 11, wherein said acousto-optical switch is composed of a plurality of series-connected acousto-optical elements.

13. A method as claimed in claim 10, wherein said optical switch is driven during said space portion for an interval having a duration less than the duration of said space portion, the part of said space portion during which said optical switch is not driven providing a guard-time which prevents leakage of said amplified optical pulse signal.

14. A method as claimed in claim 10, wherein said amplified optical pulsed signal is transmitted through an optical filter having a center wavelength different from a center wavelength λ of said optical pulsed signal.

15. A method as claimed in claim 10, which includes the further step of estimating the amplified spontaneous emission power $P_{ASE}$ by performing an interpolation for a $P_{ASE}$ distribution measured as a function of wavelength around said optical pulsed signal wavelength λ.

16. A method as claimed in claim 1, wherein said optical amplifier under measurement is an erbium-doped optical fiber amplifier, and said optical pulsed signal has a predetermined modulated intensity at a repetition rate of 10 kHz or more.

17. A method as claimed in claim 1, wherein said optical amplifier under measurement is a semiconductor laser amplifier, and said optical pulsed signal has a predetermined modulated intensity at a repetition rate of 1 GHz or more.

18. A method as claimed in claim 1, further including the steps of applying the output of said optical amplifier to a polarizer;

adjusting said polarizer to maximize the amplified optical pulsed signal; and transmitting said maximized amplified optical pulsed signal through an analyzer whereby an output power $p^{PL}_{ASE}$ in the same polarization plane as said amplified optical signal is detected.

19. A measurement system for measuring a noise figure of an optical amplifier comprising:

an input terminal connected to an input port of said optical amplifier;

an output terminal connected to an output port of said optical amplifier;

a supply means for supplying an optical pulse signal to said input terminal, said optical pulsed signal being an intensity-modulated signal having a repetition rate with a period sufficiently shorter than a life time of carriers or a life time of ions in a metastable level of said optical amplifier, the optical pulsed signal having mark portions wherein light is generated and space portions wherein light is not generated, said space portions being interposed between said mark portions; and detection means connected to the output port of said optical amplifier for separately detecting amplified spontaneous emission power ($P_{ASE}$) during space portions of said amplified optical pulsed signal, and for separately detecting amplified optical pulsed power ($P_{AMP}$) during mark portions of said amplified optical pulsed signal.

20. A measurement system as claimed in claim 19, wherein said supply means comprises an electro-optical converter, said electro-optical converter being modulated by an electrical pulsed signal; and said detection means comprises an optical switch controlled by an electrical signal synchronized with said electrical pulsed signal.

21. A measurement system as claimed in claim 19, further comprising a computing device, said computing device computing the results of detecting said amplified spontaneous emission power ($P_{ASE}$) and said amplified optical pulsed power ($P_{AMP}$) by said detecting means, and calculating a noise figure NF from the equation:

$$NF = \frac{P_{ASE}(\text{peak value})}{h_v G B_0} + \frac{1}{G}$$

where $P_{ASE}$ (peak value) is a peak value of said amplified spontaneous emission power ($P_{ASE}$); $B_o$ is an optical bandwidth when a level of said output power $P_{ASE}$ is measured; G is a gain of said optical amplifier; h is Planck's constant; and ν is an optical frequency of said optical pulsed signal.

22. A method as claimed in claim 18, wherein the noise figure is obtained by an equation:

$$NF = \frac{2 \cdot P^{PL}_{ASE}(\text{peak value})}{h_v G B_0} + \frac{1}{G}$$

wherein NF is said noise figure, and $p^{PL}_{ASE}$ (peak value) is a peak value of said output power $P^{PL}_{ASE}$.

23. A method as claimed in claim 1 wherein said mark and space periods are of equal duration.

\* \* \* \* \*